US012710506B2

(12) United States Patent
Gomez Martinez

(10) Patent No.: US 12,710,506 B2
(45) Date of Patent: Aug. 18, 2026

(54) SINGLE-ANTENNA TRACKING OF MOVING TARGET

(71) Applicant: QUALCOMM Incorporated, San Diego, CA (US)

(72) Inventor: Feliciano Gomez Martinez, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/676,207

(22) Filed: May 28, 2024

(65) Prior Publication Data

US 2025/0370085 A1 Dec. 4, 2025

(51) Int. Cl.

*G01S 5/02* (2010.01)
*G01S 5/00* (2006.01)
*G01S 5/06* (2006.01)
*H04W 64/00* (2009.01)

(52) U.S. Cl.

CPC .......... *G01S 5/0284* (2013.01); *G01S 5/0072* (2013.01); *G01S 5/0244* (2020.05); *G01S 5/0264* (2020.05); *G01S 5/06* (2013.01); *H04W 64/006* (2013.01)

(58) Field of Classification Search

CPC .... G01S 5/0284; G01S 5/0264; G01S 5/0244; G01S 5/0072; G01S 5/06; H04W 64/006
USPC .......................................................... 342/451
See application file for complete search history.

(56) References Cited

U.S. PATENT DOCUMENTS

2018/0017660 A1 1/2018 Roquel
2018/0340777 A1 11/2018 Zhang
2022/0244344 A1* 8/2022 Bao .......................... H04W 8/24
2022/0400439 A1* 12/2022 Polehn .............. H04W 52/0229
2023/0413082 A1* 12/2023 Yang ...................... H04W 24/08
2026/0046818 A1* 2/2026 Takahashi ............. H04W 64/00

FOREIGN PATENT DOCUMENTS

CN 118077265 A * 5/2024 ........... H04W 24/10
WO 2019207300 A1 10/2019
WO WO-2023211039 A1 * 11/2023 ........... H04L 5/0007

OTHER PUBLICATIONS

International Search Report and Written Opinion—PCT/US2025/029876—ISA/EPO—Jul. 30, 2025.

* cited by examiner

*Primary Examiner* — Harry K Liu
(74) *Attorney, Agent, or Firm* — Procopio, Cory, Hargreaves & Savitch LLP

(57) ABSTRACT

Aspects presented herein may enable a UE to accurately locate a moving target using a single antenna. In one aspect, a first UE tracks a first set of displacements of the first UE relative to a first reference frame during a ranging session. The first UE transmits, to a second UE, an indication to track a second set of displacements of the second UE relative to a second reference frame during the ranging session. The first UE receives, from the second UE based on the indication, the second set of displacements of the second UE. The first UE computes a relative location of the second UE with respect to the first UE based on (1) the first set of displacements, (2) the second set of displacements, and (3) a set of ranging measurements associated with the ranging session.

19 Claims, 14 Drawing Sheets

200
230
250
280
One Frame (TDD)
10 ms
subframe
slot
RB
subcarrier
OFDM symbol
DMRS R
CSI-RS
PDCCH CORESET
SSS
PSS
PDSCH
PBCH
REG 12 REs
1 CCE = 6 REGs
SS/PBCH Block
BWP
20 RBs
channel bandwidth RBs
SRS
SRS Comb 0
SRS Comb 1
PUCCH
PUSCH

800

$(\vec{y}, \vec{\theta})$ $\mathbb{R}^6$ — $m(\cdot)$ → $(\vec{y}, D)$ $\mathbb{R}^{12}$ — $f(\cdot)$ → $\vec{x}$ $\mathbb{R}^3$ — $g(\cdot)$ → $\vec{y}$ $\mathbb{R}^3$ — $h(\cdot)$ → $p$ $\mathbb{R}$ — $k(\cdot)$ → $t$ $\mathbb{R}$ $\mu(\cdot)$ $$m(\vec{y}, \vec{\theta}) = (\vec{y}, D)$$
$$\vec{x} = f(\vec{y}, D) = \vec{y} + D \cdot \vec{b}$$
$$\vec{y} = g(\vec{x}) = \vec{a} - \vec{x}$$
$$p = h(\vec{y}) = \|\vec{y}\|$$

$$t = k(p) = \frac{1}{2}\left(\frac{p-r}{\sigma}\right)$$

$$t = \mu(\vec{y}, D) = k(h(g(f(m(\vec{y}, D)))))$$

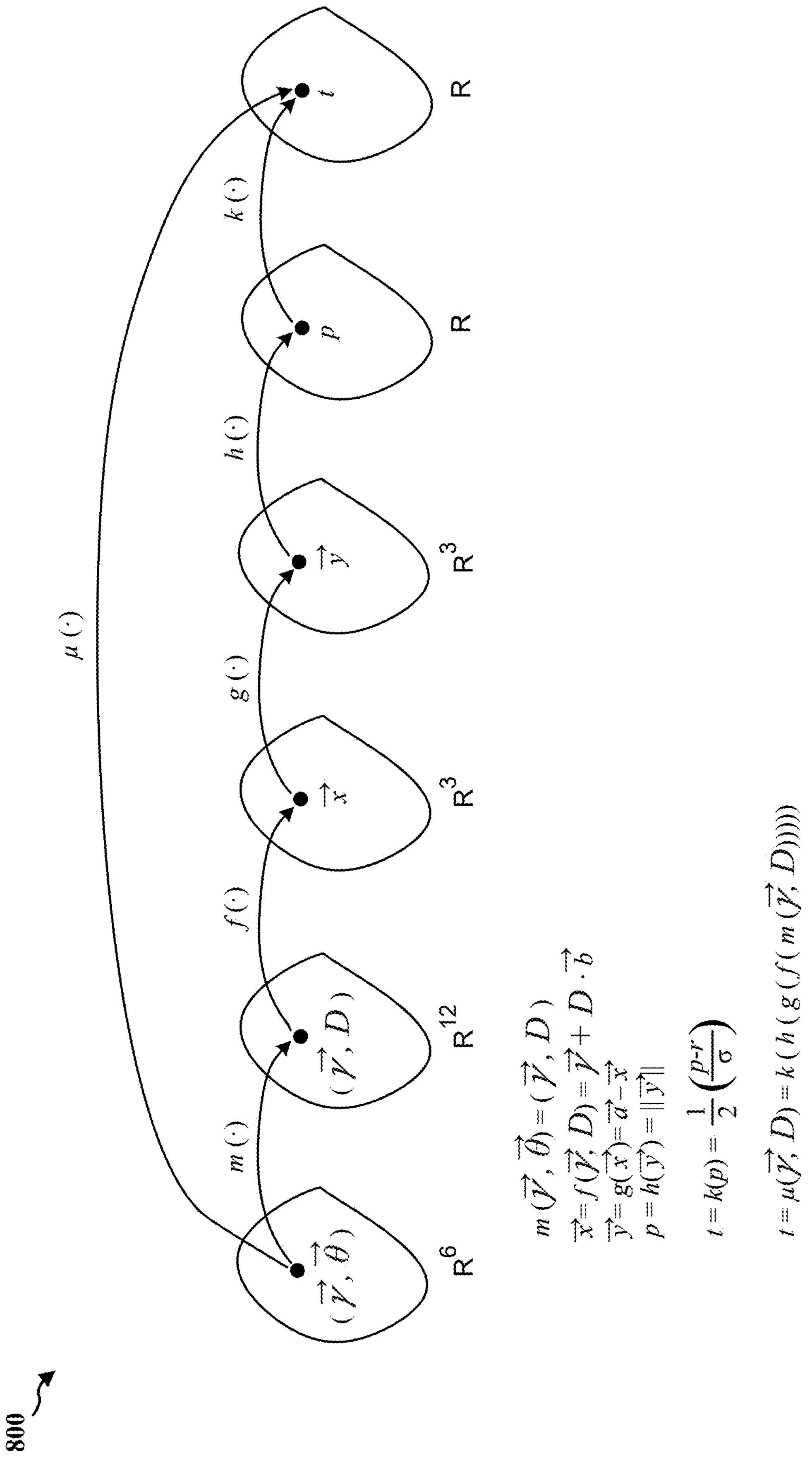

FIG. 8

SINGLE-ANTENNA TRACKING OF MOVING TARGET

TECHNICAL FIELD

The present disclosure relates generally to communication systems, and more particularly, to wireless communication involving tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some telecommunication standards also provide positioning and tracking/ranging protocols and techniques that enable mobile network operators to provide high-accuracy location/tracking/ranging services to their subscribers. For example, 5G NR include various standards for network-based positioning that use signals and features of the 5G network to perform or improve the positioning of a device. There also exists a need for further improvements in these positioning protocols and techniques.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus tracks a first set of displacements of the first user equipment (UE) relative to a first reference frame of the first UE during a ranging session. The apparatus transmits, to a second UE, an indication to track a second set of displacements of the second UE relative to a second reference frame of the second UE during the ranging session. The apparatus receives, from the second UE based on the indication, the second set of displacements of the second UE or raw sensor information associated with the second set of displacements of the second UE. The apparatus computes a relative location of the second UE with respect to the first UE based on (1) the first set of displacements, (2) the second set of displacements or the raw sensor information associated with the second set of displacements, and (3) a set of ranging measurements associated with the ranging session.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating an example decomposition of the loss function into individual functions in accordance with various aspects of the present disclosure.

DETAILED DESCRIPTION

Figure 1:
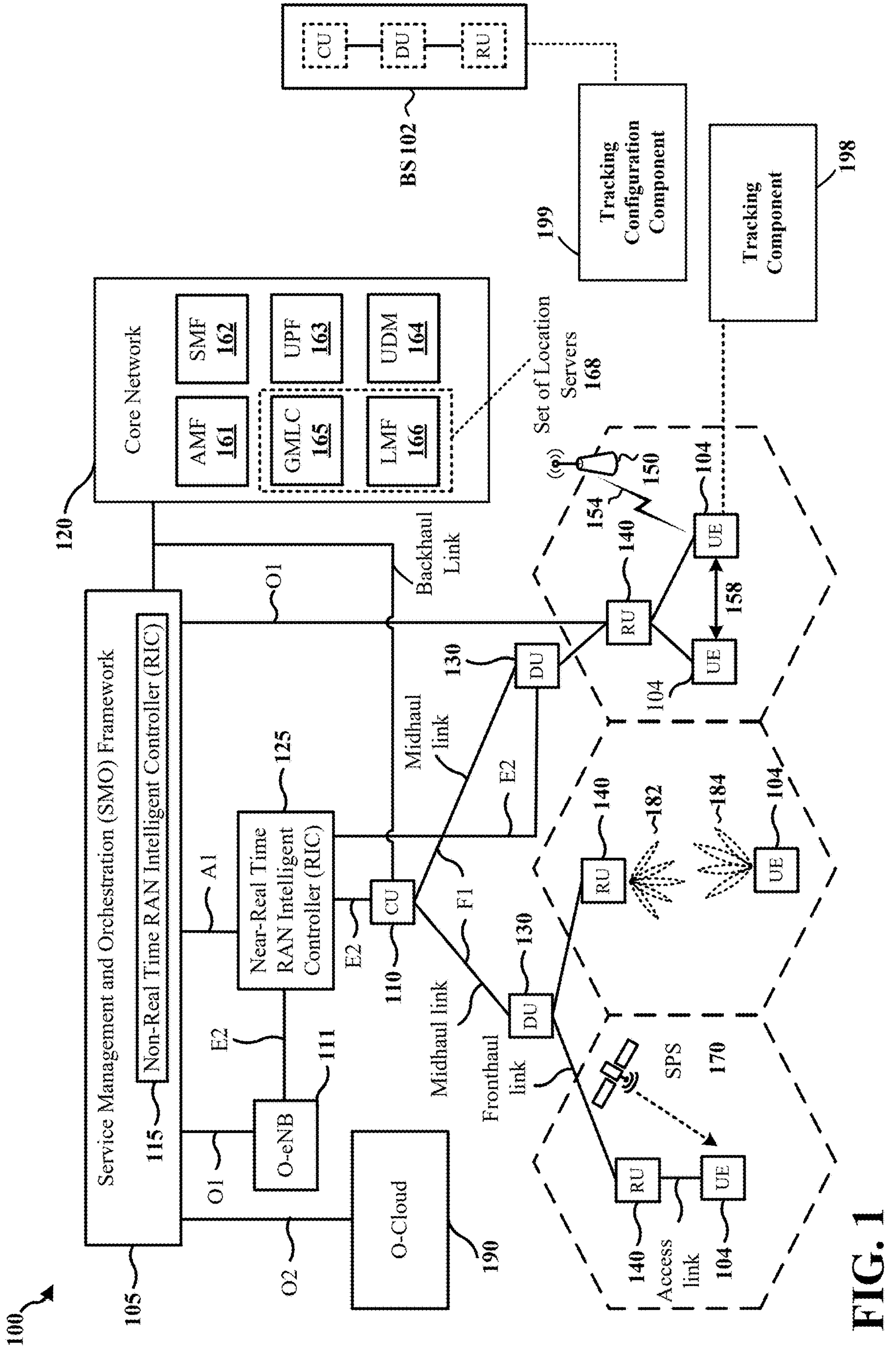
FIG. 1 is a diagram illustrating an example of a wireless communications system and an access network.

Various aspects relate generally to wireless communication and more particularly to tracking based on wireless communication. Some aspects more specifically relate to enabling a device (e.g., a tracking device) to accurately locate a moving target device using a single antenna if both devices have the capability to measure and track their own displacements. In some examples, a target device may be configured to track its own relative position/orientation (relative to its own reference frame) and send the information to the finder device, which may also track its own position/orientation (relative to its own reference frame) along with the ranges from the target devices at different points. Then the finder device may run an algorithm (e.g., building and minimizing a loss function) to estimate the reference frame of the target, thereby estimating the actual position of the target.

Particular aspects of the subject matter described in this disclosure can be implemented to realize one or more of the following potential advantages. As aspects presented herein do not specify the use of multiple antennas (e.g., as it does not specify measuring angle-of-arrival (AoA)), aspects presented herein may reduce device manufacturing cost and device size. As such, aspects presented herein may enable location capabilities to be extended to low-end devices that do not have enough antennas (e.g., to single antenna devices). For example, some wireless devices may specify multiple antennas (e.g., a premium phone with four antennas) to measure the AoA of signals from a target in order to locate and track the target. However, aspects presented herein may enable a wireless device to locate a target using a single antenna and without specifying AoA information. As such, aspects presented herein may enable more wireless devices, such as low-end wireless devices, to have tracking capabilities.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart-phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a tracking component 198 that may be configured to track a first set of displacements of the first UE relative to a first reference frame of the first UE during a ranging session; transmit, to a second UE, an indication to track a second set of displacements of the second UE relative to a second reference frame of the second UE during the ranging session; receive, from the second UE based on the indication, the second set of displacements of the second UE or raw sensor information associated with the second set of displacements of the second UE; and compute a relative location of the second UE with respect to the first UE based on (1) the first set of displacements, (2) the second set of displacements or the raw sensor information associated with the second set of displacements, and (3) a set of ranging measurements associated with the ranging session. In certain aspects, the base station 102 may have a tracking configuration component 199 that may be configured to provide configurations and/or parameters related to tracking for the UE 104.

Figures 2A, 2B, 2C, 2D:
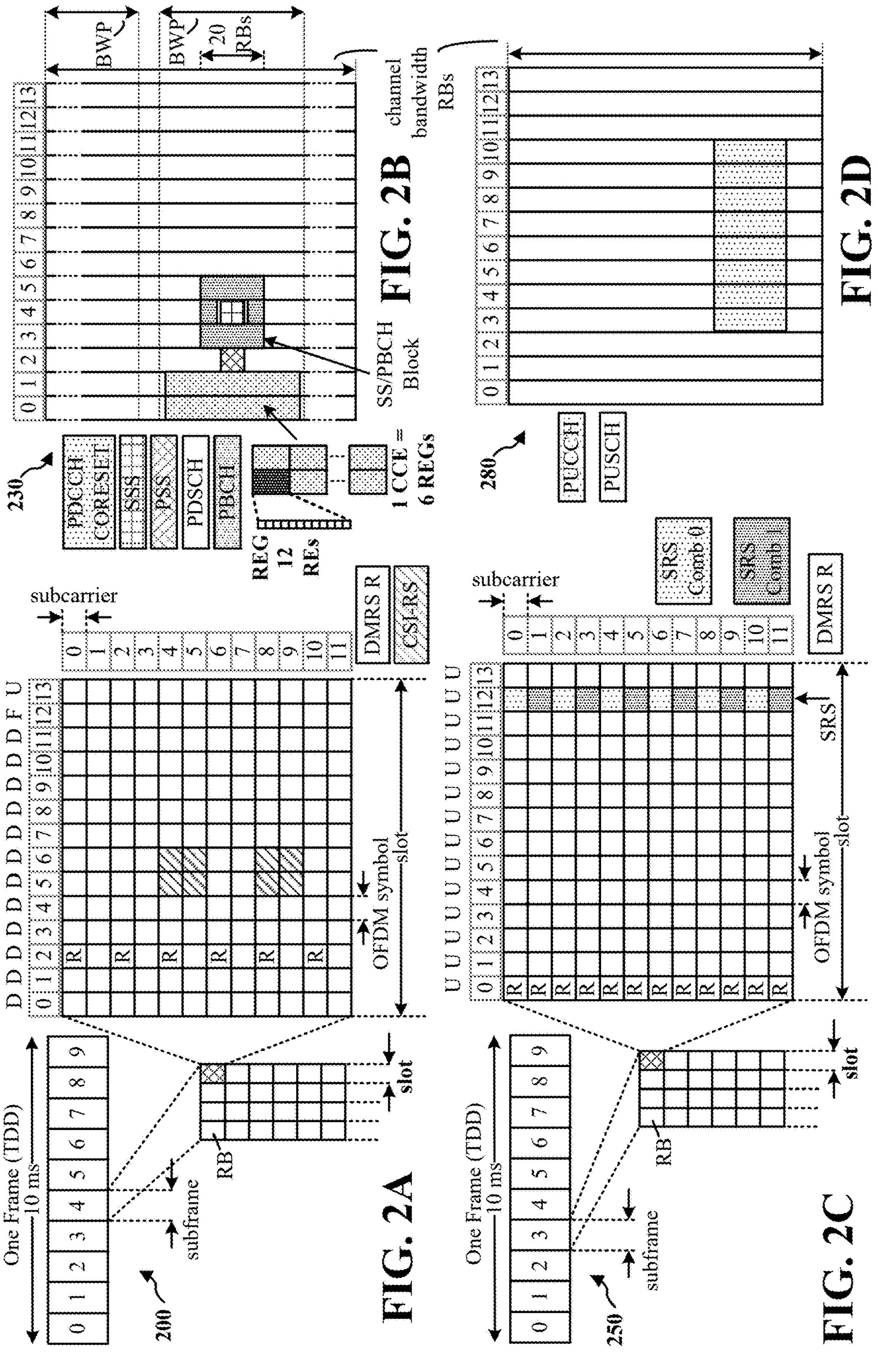
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |

TABLE 1-continued

Numerology, SCS, and CP

| μ | SCS $\Delta f = 2^{\mu} \cdot 15$[kHz] | Cyclic prefix |
|---|---|---|
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
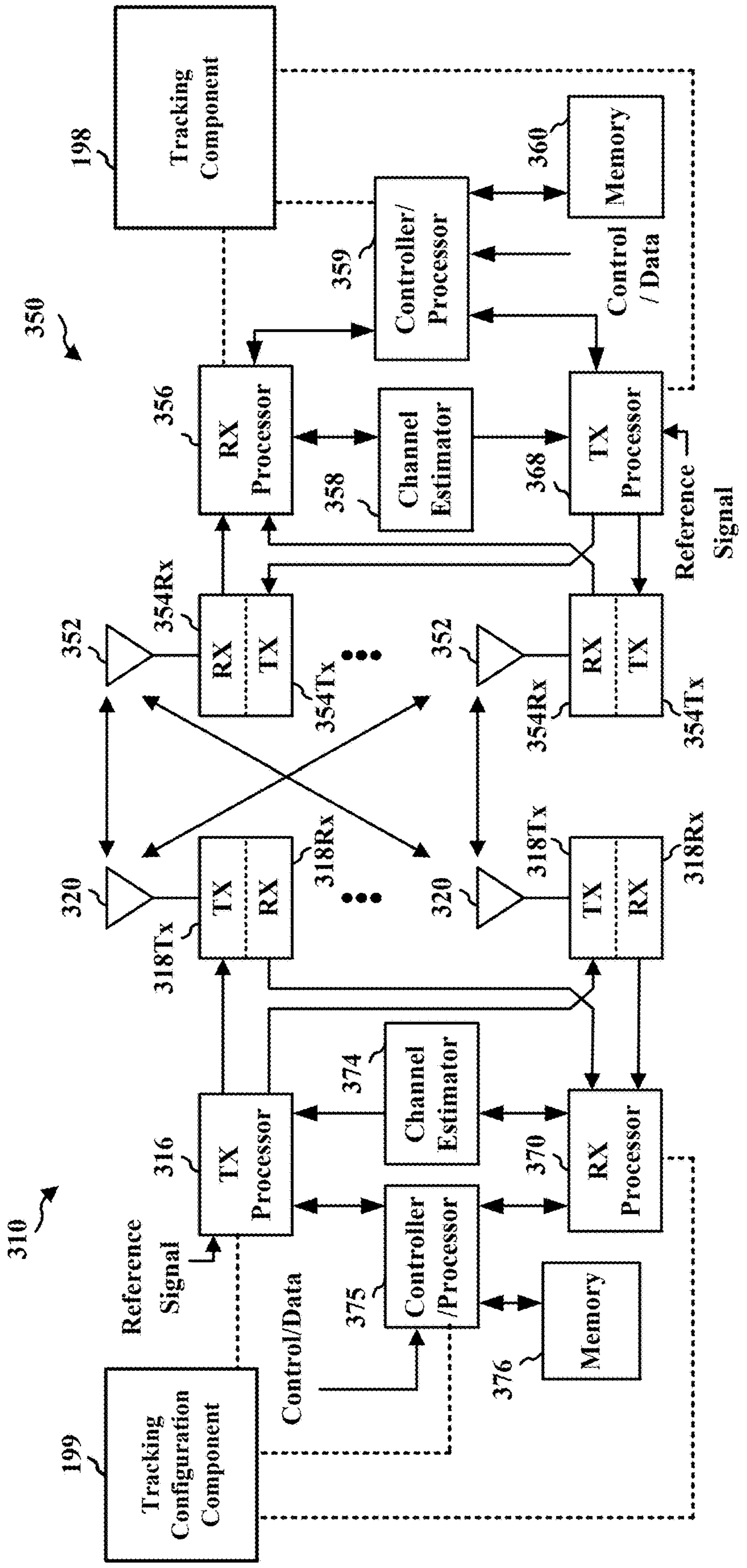
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the tracking component 198 of FIG. 1.

At least one of the TX processor 316, the RX processor 370, and the controller/processor 375 may be configured to perform aspects in connection with the tracking configuration component 199 of FIG. 1.

Figure 4:
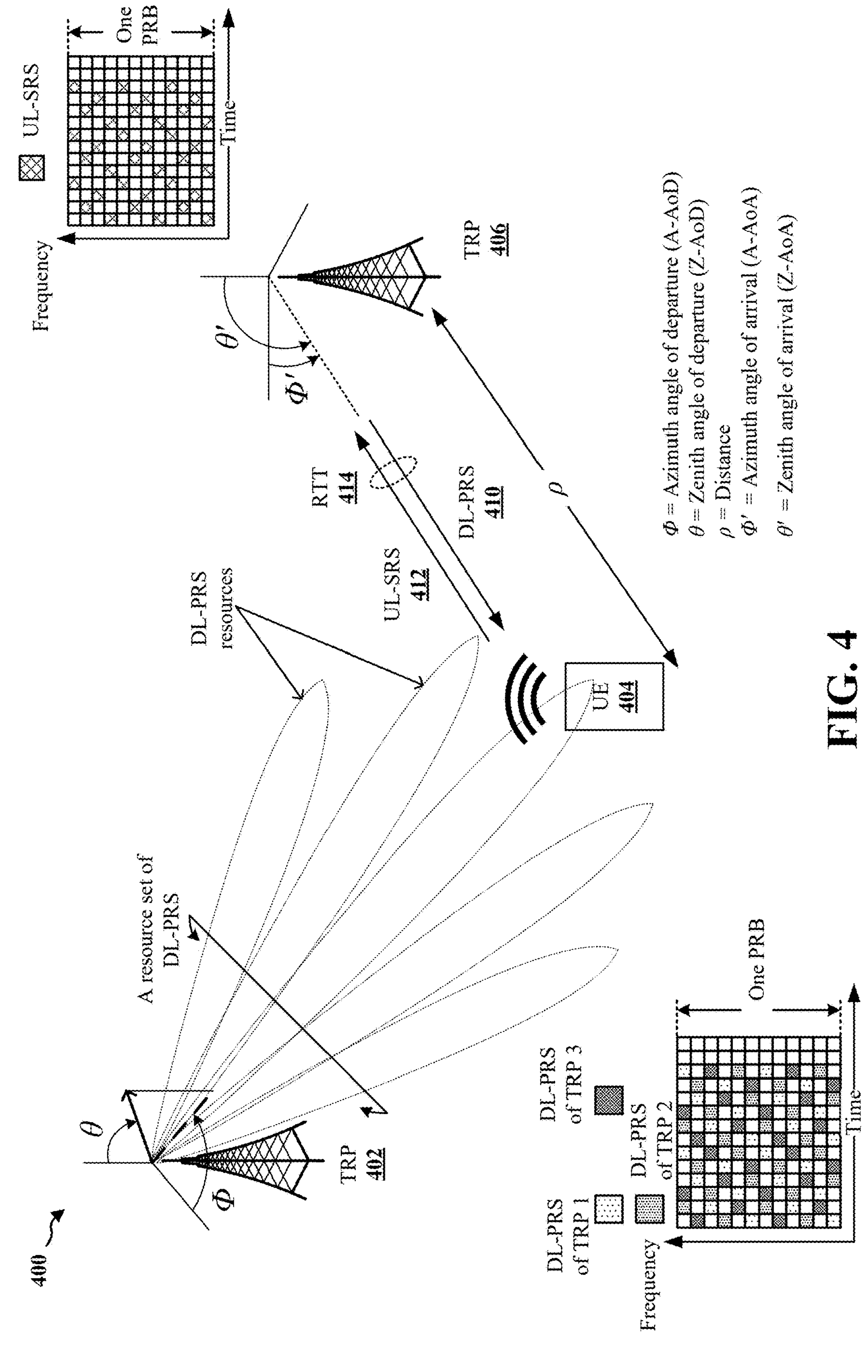
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine to and/or enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to the network-based positioning described in connection with FIG. 4, various positioning methods/mechanisms have also been developed for localizing or tracking the position of a target. These positioning methods/mechanisms may be classified into active positioning (which may also be referred to and used interchangeably with "active localization") and passive positioning (which may also be referred to and used interchangeably with "passive localization"). For active positioning, a wireless device may locate a target based on signals transmitted from the target. For example, the target may be attached or configured with a radio frequency (RF)-capable device/component, such as a tag (e.g., an RF tag), a Global Positioning System (GPS)/wireless tracker, a device/component capable of transmitting/receiving positioning reference signals, a device/component capable of performing or responding to ranging/radar operations, etc. Then, based on signals transmitted form the target (or from the RF-capable device/component attached to the target), the wireless device may calculate or estimate the location of the target. On the other hand, for passive positioning, a target may be localized and tracked without attaching an RF-capable device/component to the target. For example, RF radars, Lidars, sonars, and/or cameras are example technologies/components that may be used by a wireless device for passive positioning, where the wireless device may locate a target based on images or based on reflection of signals.

A wireless device may be able to locate and track another wireless device based on using one or more tracking technologies. For purposes of the present disclosure, tracking technologies may refer to methods and systems that are used for estimating, monitoring, and/or following the movements/locations of a target (e.g., an object, a person, an animal, a vehicle, etc.) over time. Tracking technologies may have different applications across various industries, and may use different principles and devices to achieve the tracking. Depending on implementations, some tracking technologies may be based on ranging operations, which may be referred to as ranging technologies. A ranging operation/technology may refer to a method/technique that is used to measure the distance between two points or objects. An example of ranging operation/technology may include a user locating a target device (e.g., a Bluetooth® device such as a pair of earbuds) using a mobile device (e.g., a smartphone), where the mobile device may continue to estimate the distance and/or location of the target device based on signals from the target device. Depending on the context, in some examples, the term "track/tracking" may be used interchangeably with the term "position/positioning" or "location/locationing." For example, a wireless device may be configured to track a target based on estimating the position/location of the target using Wi-Fi technologies, which may be referred to as Wi-Fi tracking or Wi-Fi positioning/locationing. Similarly, depending on the context, in some examples, the term "tracking" may be used interchangeably with the term "ranging." For example, a wireless device may be configured to track a target based on performing ranging against the target using UWB technologies, which may be referred to as UWB/UWB-based tracking or ranging.

The tracking technologies may be used in various fields such as surveying, navigation, robotics, telecommunications, etc. Examples of tracking technologies may include:

(1) global navigation satellite system (GNSS)/global positioning system (GPS) tracking—GNSS/GPS tracking relies on a network of satellites to provide real-time location information. GNSS/GPS receivers, often embedded in devices like smartphones, vehicles, or wearables, may determine their precise location and movement.

(2) radio-frequency identification (RFID) tracking—RFID technology uses radio waves to identify and track objects equipped with RFID tags, where these RFID tags may include electronic information that can be read by RFID readers, enabling the tracking of items in logistics, inventory management, and access control.

(3) Bluetooth® (BT) tracking—Bluetooth technology may be used for tracking by measuring the signal strength between devices. Bluetooth channel sounding (CS) (BTCS) is another technique that may also be used for tracking by measuring the round-trip-time (RTT)/the phase delay of RF signals between devices. Bluetooth beacons or tags may be attached to objects or carried by individuals, and their proximity to Bluetooth receivers may be used to estimate their location.

(4) Wi-Fi® tracking—Wi-Fi tracking may involve using signals from Wi-Fi access points (APs) to estimate the location of target devices. This tracking method is often suitable for indoor environments, such as malls and airports, for tracking people or assets.

(5) cellular tracking—mobile network infrastructure may be able to track devices through the triangulation of cell tower signals. The approximate location of a mobile device can be determined by analyzing the signals it receives from nearby cell towers.

(6) inertial navigation systems—these systems may use accelerometers and gyroscopes to track changes in velocity and orientation.

(7) computer vision tracking—advanced computer vision technologies, including object recognition and tracking algorithms, may enable cameras and sensors to track the movement of objects or people based on visual data.

(8) ultra-wideband (UWB) tracking—UWB tracking may utilize signals with very high frequency ranges or bandwidths. UWB technology transmits data using a broad spectrum of frequencies, enabling precise and accurate tracking of objects or individuals in both indoor and outdoor environments. UWB tracking systems typically operate in the frequency range of 3.1 to 10.6 gigahertz.

As discussed above, ranging operations/technologies may refer to methods/techniques that is used to measure the distance between two points or objects. Examples of ranging operations/technologies may include:

(1) triangulation—triangulation involves measuring the angles between an observer and two known points or landmarks. By using trigonometry, the distance to the object may be calculated or estimated.

(2) time of flight (ToF)—ToF technology measures the time taken for a signal (such as light or sound) to travel from a transmitter to a target and back to a receiver. By knowing the speed of the signal, usually the speed of light or sound, the distance may be calculated or estimated.

(3) GNSS—GNSS systems, such as GPS, global navigation satellite system (GLONASS), Galileo, and BeiDou, use signals from satellites to determine the position of a receiver on Earth. By analyzing the time it takes for signals from multiple satellites to reach the receiver, its position (including distance) may be calculated or estimated.

(4) RFID—RFID technology uses electromagnetic fields to automatically identify and track tags attached to objects. The distance between the reader and the RFID tag may be estimated based on the strength of the received signal.

(5) ultrasonic ranging—ultrasonic ranging involves emitting ultrasonic pulses and measuring the time it takes for the pulses to bounce back from the object. The speed of sound in the medium determines the distance.

(6) laser ranging (e.g., light detection and ranging (Lidar))—laser ranging uses lasers to measure the distance to a target by calculating the time it takes for laser pulses to travel to the target and back.

Among the aforementioned tracking/ranging technologies, UWB, Bluetooth, and/or Wi-Fi based tracking/ranging have continued to be widely used and developed for most wireless devices (e.g., consumer devices such as mobile phones, smart watches, etc.) due to their accessibility and tracking/ranging precisions.

UWB tracking/ranging may refer to using a UWB device/technology to locate and track objects, people, or assets within a certain range. A UWB device (e.g., a device that is capable of performing UWB tracking/ranging) may use pulse-based radio signaling (e.g., Short-pulse-UWB) instead of orthogonal frequency division multiplexing (OFDM)-based signaling (e.g., Multi-Band (MB)-OFDM-UWB (MB-OFDM-UWB)). Short-pulse-UWB signaling may transmit with the energy for each bit spread over the entire UWB channel bandwidth (e.g., 1.37 GHz, 4 GHZ, etc.) with varying pulse amplitude and/or pulse polarity without using a RF carrier while MB-OFDM-UWB may transmit each bit using a 4 MHz bandwidth channel.

Using short-pulse-UWB signaling systems may provide several advantages over MB-OFDM-UWB signaling systems and other OFDM-based systems. For example, a short-pulse-UWB signaling system may provide better fading characteristics (e.g., Gaussian-modeled fading versus Rayleigh-modeled fading, and/or less than 1% of channels experiencing 2 dB or more fading) than an MB-OFDM-UWB signaling system. As other examples, a short-pulse-UWB signaling system may operate accurately without employing FEC (Forward Error Correction), using no-rake processing, with lower peak-to-average RF, and/or with longer battery life than an MB-OFDM-UWB signaling system. Short-pulse-UWB also does not use traditional modulation and demodulation techniques such as Fast Fourier Transforms (FFT), but may use time-domain or space-time processing techniques. Short-pulse-UWB may utilize various shapes (e.g., Gaussian pulses, Monocycle pulses, Hermite pulses, etc.) and the shape used may be chosen based on their properties in time and frequency domains among other factors, such as Bandwidth utilization, Interference Mitigation, Power Spectral Density, Multipath fading and inter-symbol interference, design complexity, power consumption, range, tradeoffs for ultra-fast sampling, etc. Short-pulse-UWB, in some cases, may benefit from a high speed Analog-to-Digital converter (ADC) and a high speed Digital-to-Analog Converter (DAC) to be able to handle the very wide frequency band used; however, there may be other ways to handle the need for ultra-fast sampling such as using Time Hopping techniques, Direct Sequence coding techniques, etc.

MB-OFDM-UWB may divide up spectrum into several frequency sub-bands and OFDM is applied within each band; whereas, other OFDM systems may typically operate within a fixed frequency band. The complex waveform created by combining the multiple-sub-bands results in a final waveform that used for transmission for MB-OFDM-UWB. MB-OFDM-UWB also varies from other OFDM systems by not using a guard interval, using simpler modulation schemes like Binary Phase Shift keying (BPSK) or Quadrature phase-shift keying (QPSK) vs. 64 or 256 Quadrature Modulation (QAM), utilizes a constant power level whereas other OFDM systems may utilize power control for varying channel conditions, etc.

Bluetooth tracking/ranging may refer to using Bluetooth device/technology to locate and track objects, people, or assets within a certain range. This technology may rely on Bluetooth-enabled devices, such as smartphones, tablets, or specialized Bluetooth tags, to communicate with each other and determine their relative positions.

Bluetooth tracking may include beacon-based tracking and Bluetooth low energy (LE) tracking. Beacon-based tracking may involve deploying Bluetooth beacons that emit Bluetooth signals at regular intervals. These signals are picked up by Bluetooth-enabled devices in the vicinity, such as smartphones or tablets. By measuring the signal strength and timing of these beacon signals, the receiving devices can estimate their proximity to the beacon. This information may then be used to determine the location of the Bluetooth-enabled device within the range of the beacon. Bluetooth LE tracking may enable devices to communicate over short distances while consuming minimal power. Bluetooth LE tracking systems may include attaching tags to objects or carried by individuals, and Bluetooth LE receivers (such as smartphones or dedicated receivers) that scan for these tags. The receivers detect the signals transmitted by the tags and use signal strength and other parameters to estimate the distance between the tag and the receiver. By triangulating signals from multiple receivers, the system can determine the location of the tagged object or person. Bluetooth channel sounding (CS) is a technique used in Bluetooth communication to measure time/phase delay of BT signals, such that distance between wireless devices may be estimated/measured more accurately.

Wi-Fi tracking/ranging may refer to using a Wi-Fi capable device/technology for monitoring and tracking the movement of devices within a Wi-Fi network's coverage area. Wi-Fi tracking may rely on the unique media access control (MAC) addresses of Wi-Fi-enabled devices, such as smartphones, tablets, and laptops, to identify and track them as they move within the network's range. For example, Wi-Fi tracking utilizes Wi-Fi access points (APs), which are devices that provide wireless network connectivity to devices within their range. These access points continuously broadcast Wi-Fi signals, allowing Wi-Fi-enabled devices to connect to the network. When Wi-Fi-enabled devices come within range of Wi-Fi access points, they may be configured to automatically send out probe requests, seeking available networks to connect to. Wi-Fi access points receive these probe requests and respond with probe responses containing information about the network, such as the service set identifier (SSID) and signal strength. Each Wi-Fi-enabled device may have a unique MAC address associated with its network interface. Wi-Fi tracking systems capture these MAC addresses from the probe requests and responses exchanged between devices and access points. By monitoring the signal strength and timestamps of probe requests and responses from multiple access points, Wi-Fi tracking systems may triangulate the position of Wi-Fi-enabled devices within the network's coverage area.

Figure 5:
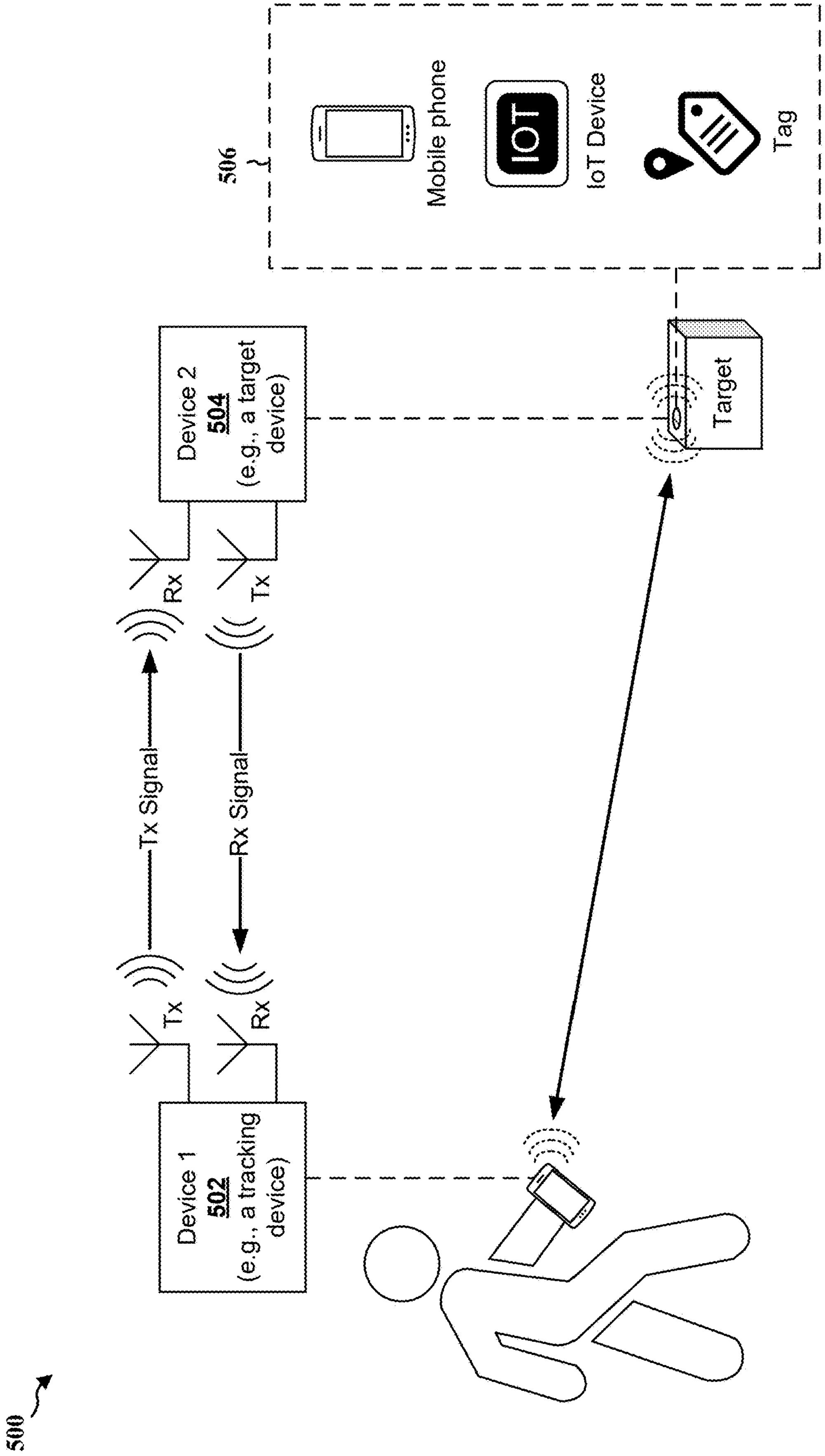
FIG. 5 is a diagram illustrating an example of tracking in accordance with various aspects of the present disclosure.

FIG. 5 is a diagram 500 illustrating an example of tracking (e.g., active positioning) in accordance with various aspects of the present disclosure. A first device 502 (which may also be referred to as a "tracking device" or a "finder device" for purposes of the present disclosure) may be able to locate a second device 504 (which may also be referred to as a "target" or a "target device" for purposes of the present disclosure) based on transmitting signals (which may be referred to as "transmission (Tx) signals") to the second device 504, and receive signals (which may be referred to as "reception (Rx) signals") from the second device 504. Depending on implementations, the Rx signals may be signals reflected from the second device 504 (e.g., based on the Tx signals) or signals generated by the second device 504. Then, based on the time-of-flight (ToF) of the Tx signals and the Rx signals, the first device 502 may estimate the distance of the second device 504 from the first device 502. In some configurations, if the first device is also capable of measuring the angle-of-arrival (AoA) of the Rx signals, the first device 502 may also be able to estimate the direction of the second device 504 from the first device 502 (which may be referred to as the relative direction from the first device 502). As shown at 506, the second device 504 may be a mobile phone, an Internet of Things (IoT) device, or a tag (e.g., a UWB tag), and the localizing and/or tracking of the second device 504 may be based on using Bluetooth® tracking, Wi-Fi tracking, or UWB tracking, etc.

While the diagram 500 may depict an example use case of a user trying to find a target, such as an object (e.g., a key, a wallet, etc.) or a person (e.g., the person's family member, friend, etc.), around the user using a smartphone, it may be difficult for the smartphone to locate the target or to determine the precise location of the target when the target is moving (as opposed to static). This may include scenarios such as (1) Friend A is trying to find Friend B in a large public space where both users are moving; (2) a user is trying to find a smart tag that is attached to a piece of luggage that is moving (e.g., is moving on an airport carrousel); (3) a group of fire-fighters are carrying augmented reality (AR) headsets or smart glasses that display the relative position of other team members when they get into a building on fire, where all fire-fighters/users are moving; and/or (4) a user wants to use a tablet or a display to extend the desktop from a laptop. Instead of specifying the user to manually configure the relative positions of the laptop/tablet/display, the devices may detect each other's relative positions, so that the operating system (OS) of the laptop may display the right portion of the desktop in each display, etc.

Figure 6:
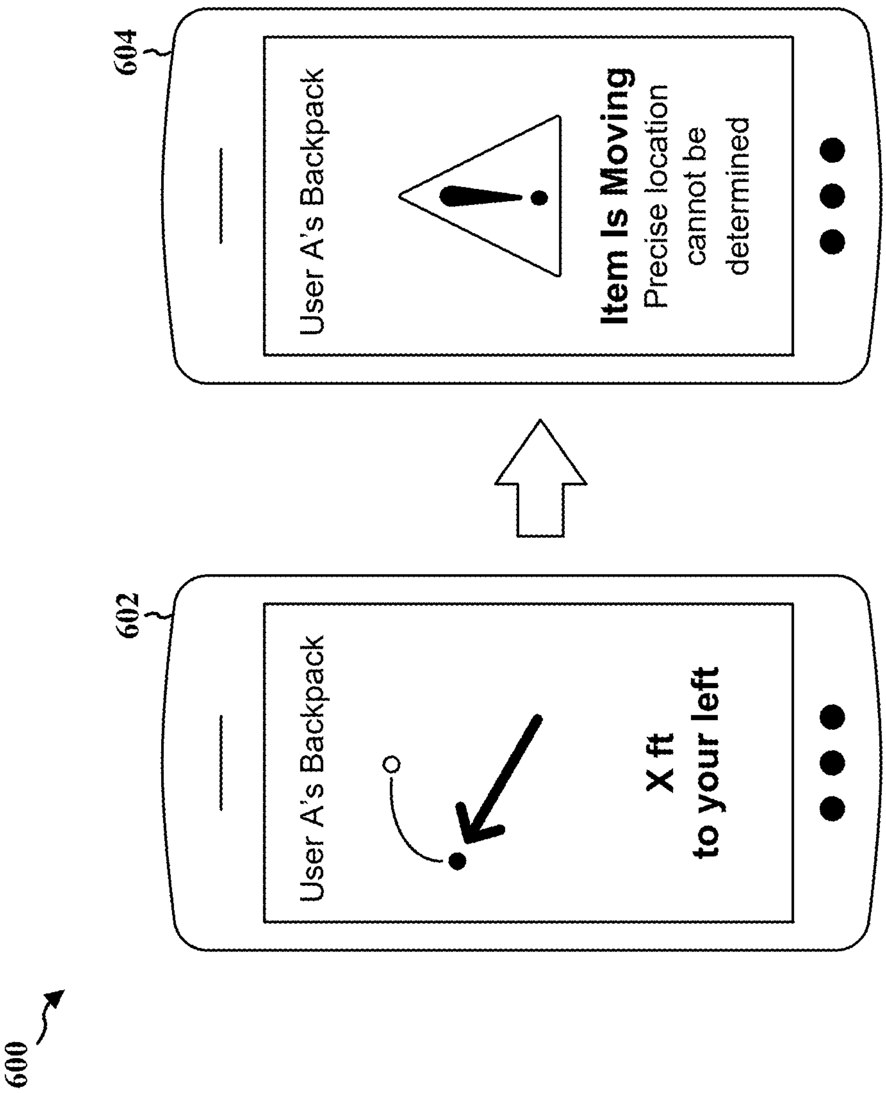
FIG. 6 is a diagram illustrating an example of a smartphone unable to find a moving target in accordance with various aspects of the present disclosure.

FIG. 6 is a diagram 600 illustrating an example of a smartphone unable to find a moving target in accordance with various aspects of the present disclosure. While most tracking mechanisms may enable one device to locate another device as described in connection with FIG. 5, they may not work (precisely) when the target is moving. For example, as shown at 602, when a user's is trying to find a backpack using a mobile phone (e.g., a backpack that is associated with/attached to a tracker such as an RFID or a tag) while the user is moving, the mobile phone may display directional information of the backpack to the user (e.g., the backpack is X feet to the user's front, back, left, or right, etc.). However, as shown at 604, if the backpack is also moving, the mobile phone may stop providing directional information of the backpack, and may display a warning message that indicates the location/precise location of the backpack cannot be determined. This is likely that the tracking/location algorithm used by the mobile phone specifies/relies on the target (e.g., the backpack) being static. In addition, to find a moving target, some tracking/location algorithms may specify multiple antennas to be used, which may increase the manufacturing cost of the tracking devices.

Aspects presented herein may enable a device (e.g., a tracking device) to accurately locate a moving target using a single antenna. For example, aspects presented herein may enable a device to locate a moving target based on: (a) tracking its relative displacement, (b) tracking the target's relative displacement, (c) perform ranging measurements, and (d) exchanging information between devices at each position to determine the target position, instead of having to perform AoA measurements. As aspects presented herein do not specify the use of multiple antennas (e.g., as it does not specify measuring AoA), aspects presented herein may reduce device manufacturing cost and device size. As such, aspects presented herein may enable location capabilities to be extended to low-end devices that do not have enough antennas (e.g., to single antenna devices or devices configured to use just one antenna in multiple antennas).

Figure 7:
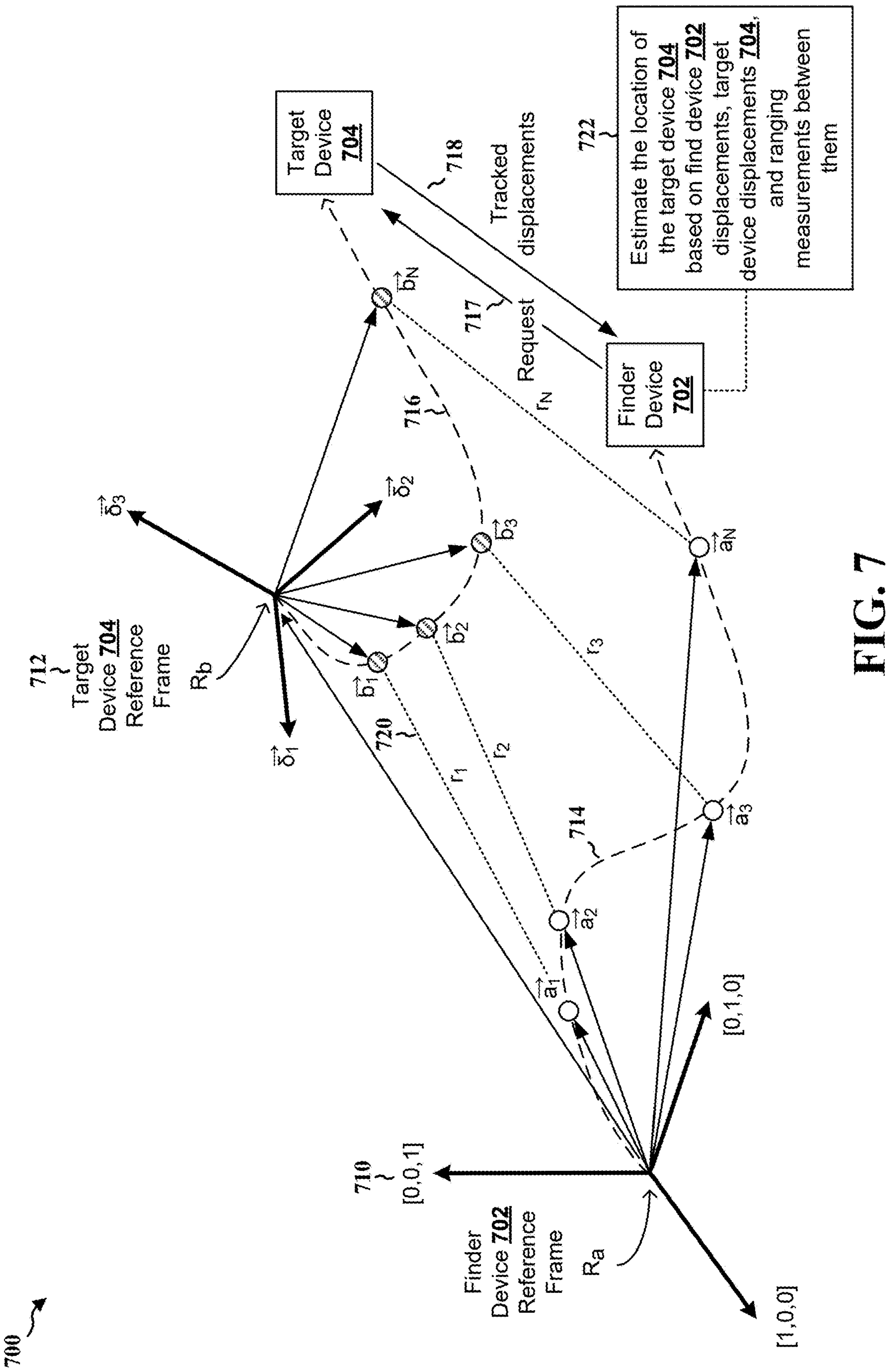
FIG. 7 is a diagram illustrating an example of locating a moving target in accordance with various aspects of the present disclosure.

FIG. 7 is a diagram 700 illustrating an example of locating a moving target in accordance with various aspects of the present disclosure. For purposes of the illustration, a device that is locating a target may be referred to as a "finder device," and the target that is being located may be referred to as a "target device." Each of the finder device or the target device may be a UE.

In one aspect of the present disclosure, if a finder device 702 (e.g., the first device 502) with just one antenna (or is configured to use just one antenna in multiple antennas) and a target device 704 (e.g., the second device 504) both support at least one type of ranging technology, such as UWB ranging, BT ranging or BT channel sounding (CS), or Wi-Fi ranging, etc., the finder device 702 may be able to locate the target device 704 that is moving based on their displacements relative to their local reference frames. In that case, the finder device 702 may be configured to initiate a ranging/tracking session with the target device 704 to determine the relative location of the target device (e.g., based on an input from the user).

As shown at 710, after the ranging/tracking session is initiated (or prior to the ranging/tracking session is initiated), the finder device 702 may be configured to track its displacement relative to its local reference frame $R_a$ (e.g., with example coordinates/vectors [1,0,0], [0,1,0], [0,0,1]), and as shown at 712, the target device 704 may be configured to track its displacement relative to its local reference frame $R_b$ (e.g., with example coordinates/vectors $\vec{\delta_1}, \vec{\delta_2}, \vec{\delta_3}$). In other words, both the finder device 702 and the target device 704 may be configured to track their own displacements relative to their own local reference frames. However, initially each device may not know the reference frame of the other, where the finder device 702 may not know the reference frame $R_b$ of the target device 704, and the target device 704 may not know the reference frame $R_a$ of the finder device 702.

For example, as shown at 714, the finder device 702 may be configured to track and record its own displacements periodically (e.g., every X seconds, milliseconds, etc.). Assuming a displacement of the finder device 702 is represented by a vector $[\vec{a_i}]$, the displacements of the finder device 702 over a period of time (and at different locations) may be represented by a set of vectors $[\vec{a_1}, \vec{a_2}, \vec{a_3}, \ldots, \vec{a_N}]$. In some implementations, if the finder device 702 detects that it is stationary (e.g., is not moving), the finder device 702 may be configured to instruct its user to move the finder device. For example, the finder device 702 may include a user interface (UI), and the finder device 702 may be configured to provide, at the UI, at least one of (1) a guidance for moving the finder device 702, or (2) a guidance for moving the finder device 702 towards a direction (e.g., discussed in connection with FIG. 9 below). In some examples, the UI may include a graphical user interface (GUI) that is configured to display a first graphical icon that is configured to move as the first UE is moved.

Similarly, as shown at 716, the target device 704 may also be configured to track and record its own displacements periodically. Assuming a displacement of the target device 704 is represented by a vector $[\vec{b_i}]$, the displacements of the target device 704 over a period of time (and at different locations) may be represented by a set of vectors $[\vec{b_1}, \vec{b_2}$, b3, . . . , $\vec{b_N}]$. Then, as shown at 718, the target device 704 may be configured to provide its tracked displacements (e.g., the set of vectors $[\vec{b_1}, \vec{b_2}, \vec{b_3}, \ldots, \vec{b_N}]$) or raw information/measurements related to the displacements to the finder device 702, such as over wireless communications. In some implementations, as shown at 717, the target device 704 may track or may start to track its displacements based on a request from the finder device 702. For example, during the tracking/ranging session, the finder device 702 may transmit a request or an indication to the target device 704 to request the target device 704 to track and report its displacements (relative to a reference frame that may be different from the finder device 702).

In addition, as shown at 720, while the finder device 702 and the target device 704 are tracking and recording their displacements periodically, the finder device 702 may also be configured to perform a set of ranging with the target device 704, such as described in connection with FIG. 5 (e.g., using ultrawide band (UWB) ranging, Wi-Fi® ranging, or Bluetooth® channel sounding (BT CS), etc.). For example, when the finder device 702 is at each tracked/recorded displacement (e.g., $\vec{a_1}, \vec{a_2}, \vec{a_3}, \ldots, \vec{a_N}$), the finder device 702 may transmit a reference signal (e.g., a Tx signal) to the target device 704 and receive a reference signal (e.g., an Rx signal) from the target device 704. Then, based on the transmitted reference signal and the received reference signal, the target device 704 may estimate a distance $r_i$ between the finder device 702 and the target device 704 at each displacement, where each distance $r_i$ may also be referred to as a ranging measurement. As such, the set of displacements of the finder device 702 (e.g., the set of vectors $[\vec{a_1}$, a2, $\vec{a_3}, \ldots, \vec{a_N}]$) may correspond to a set of ranging measurements $[r_1, r_2, r_3, \ldots, r_N]$.

Then, as shown at 722, based on the displacements of the finder device 702 $(\vec{a_i})$, the displacements of the target device 704 $(\vec{b_i})$, and the ranging measurements $(r_i)$ between them, the finder device 702 may be able to estimate the location and/or the relative direction of the target device 704. For example, in one aspect of the present disclosure, the finder device 702 may use its own displacement $(\vec{a_i})$, the displacement of the target device 704 ($\vec{b}_i$), and the ranging measurements ($r_i$) as inputs, and build a loss function $\mu(\cdot)$ and minimize it:

$$\mu(\vec{\gamma}, D) = \mu(\gamma_1, \gamma_2, \gamma_3, \theta_1, \theta_2, \theta_3) = \sum_{i=1}^{N} \frac{1}{2}\left(\frac{r_i - \left\|\vec{a}_i - \left(\gamma + D\vec{b}_i\right)\right\|}{\sigma_{r_i}}\right)^2$$

$$R_b^* = \left(\vec{\gamma}^*, D^*\right) = \underset{\vec{\gamma}, D}{\operatorname{argmin}}\{\mu(\vec{\gamma}, D)\}$$

where ($\vec{\gamma}$,D) are parameters used to transform between the reference frame of the finder device 702 and the reference frame of the target device 704, $\vec{\gamma}$ being the displacement and D being the rotation. Thus, using the parameters ($\vec{\gamma}$,D), the finder device 702 may locate the position of the target device 704, and may display the location of the target device 704 to the user of the finder device 702.

In some implementations, the finder device 702 may include a method to estimate the accuracy of the position of the target device 704. If the accuracy is below an accuracy/quality threshold, the finder device 702 (or an application running on the finder device) may inform the user to keep moving. If the accuracy meets the accuracy/quality threshold, then the finder device 702 or the application may start displaying the location information to the user, such as described in connection with FIG. 9. As the finder device 702 and/or the target device 704 move, new displacement/ranging information may be obtained, and the finder device 702 may repeat the calculation to improve the accuracy.

Also, the finder device 702 may calculate a distance between the finder device 702 and the target device 704 based on at least one of the computed relative location of the target device 704 and/or the ranging measurement(s), and the finder device 702 may terminate the ranging session when the calculated distance is below a distance threshold (e.g., after the finder device 702 finds the target device), such as for purposes of reducing power consumption.

For purposes of illustration, the following notations will be used in association with the loss function $\mu(\cdot)$ and the diagram 700:

- i Index used to refer to individual tuples, with $i \in \{1, \ldots, N\}$.
- N Number of tuples to consider.
- $t_i$ Time at which the i-th tuple was generated.
- $R_a$ Symbol used to denote the initial reference frame of the finder.
- $R_b$ Symbol used to denote the initial reference frame of the target.
- $\vec{a}_i$ Position of the finder device at step i, relative to $R_a$.
- $\vec{b}_i$ Position of the target device at step i, relative to $R_b$.
- $\vec{\gamma}$ Position of $R_b$ relative to $R_a$.
- $\vec{\delta}_1$, $\vec{\delta}_2$, $\vec{\delta}_3$ Orthonormal vectors of reference frame $R_b$ expressed in terms of $R_a$
- D A matrix formed by $\vec{\delta}_1$, $\vec{\delta}_2$, $\vec{\delta}_3$ as columns.
- $r_i$ RTT distance measured at the i-th sample.
- $\mu(\gamma,D)$ Loss function to be minimized.
- $\mu^R(\gamma,D)$ RTT component of the loss function.
- $\mu^G(\gamma,D)$ Geometric component of the loss function.

Assume the target device 704 determines that its own position relative to its initial reference frame $R_b$ is given by $\vec{b}$. Then the position of the target device 704 in the frame of reference of $R_a$ may satisfy the following equation:

$$\vec{x} = \vec{\gamma} + \vec{\delta}_1 \cdot b_1 + \vec{\delta}_2 \cdot b_2 + \vec{\delta}_3 \cdot b_3 \tag{1}$$

$$\vec{x} = \begin{bmatrix} \gamma_1 \\ \gamma_2 \\ \gamma_3 \end{bmatrix} + \begin{bmatrix} \delta_{11} & \delta_{21} & \delta_{31} \\ \delta_{12} & \delta_{22} & \delta_{32} \\ \delta_{13} & \delta_{23} & \delta_{33} \end{bmatrix} \cdot \begin{bmatrix} b_1 \\ b_2 \\ b_3 \end{bmatrix} = \vec{\gamma} + D \cdot \vec{b} \tag{2}$$

Equation (2) above shows that once two elements of the target reference frame $R_b$ are known (e.g., given by $\vec{\gamma}$ and D), then it may be trivial to transform a $R_b$-referenced vector into a $R_a$-referenced vector as shown by the diagram 700.

Then, to find the location of the target device 704, the finder device 702 may be configured to build a loss function, such as a round-trip-time (RTT) loss function. For example, assuming that at time $t_i$ the finder device 702 and the target device 704 (collectively as "devices" hereafter) may have measured the tuple ($r_i$, $\vec{a}_i$, $\vec{b}_i$). To evaluate whether a certain pair of $\vec{\gamma}$ and D are a suitable/good fit, the measured tuple may be used to convert $\vec{b}_i$ into the $R_a$ reference frame:

$$\vec{x}_i = \vec{\gamma} + D \cdot \vec{b}_i \tag{3}$$

The finder device 702 may then determine the distance between $\vec{a}_i$ and $\vec{x}_i$ and compare it to the ranging measurement $r_i$:

$$\rho_i = \|\vec{a}_i - \vec{x}_i\| = \left\|\vec{a}_i - \left(\vec{\gamma} + D \cdot \vec{b}_i\right)\right\| \tag{4}$$

and build a term of the loss function that may take small values if $\rho_i$ is very similar to $r_i$, and large values otherwise:

$$\mu_i^R(\vec{\gamma}, D) \frac{1}{2}\left(\frac{r_i - \rho_i}{\sigma_{r_i}}\right)^2 \tag{5}$$

In the above equation, a normalization factor $\sigma_{r_i}$ is used, which may be given by the standard deviation of the RTT measuring process for the $r_i$. Different indices i may have different values for $\sigma_i$ if they use different radios each time (e.g., $\sigma_i$ for UWB may typically be smaller than for Wi-Fi).

Finally, the finder device 702 may repeat the process for all available measurements $i \in \{1, \ldots, N\}$:

$$\mu^R(\vec{\gamma}, D) = \sum_{i=1}^{N} \mu_i^R(\vec{\gamma}, D) = \sum_{i=1}^{N} \frac{1}{2}\left(\frac{r_i - \rho_i}{\sigma_{r_i}}\right)^2 = \sum_{i=1}^{N} \frac{1}{2}\left(\frac{r_i - \left\|\vec{a}_i - \left(\vec{\gamma} + D \cdot \vec{b}_i\right)\right\|}{\sigma_{r_i}}\right)^2 \tag{6}$$

In theory, if the measurement of the tuples ($r_i$,$\hat{a}_i$, $\vec{b}_i$) were accurate, then it is likely that there may exist a specific pair of ($\vec{\gamma}$,D) for which $\mu^R$ would take a zero value. However, in practice all the measurements may have some noise, but in any case, there will be a specific pair of ($\vec{\gamma}$,D) for which $\mu^R$ achieves the minimum value. This pair may be the best estimate for the reference frame $R_b$ of the target device 704.

To build the geometry loss function, in principle, when minimizing $\mu^R$, the $\vec{\gamma}$ may be allowed to take any value. However, the matrix D may not be able to take any value, because it may be specified to satisfy following constraints:

(a) All columns have unit norm. Mathematically: $\|\vec{\delta}_j\|=1, \forall j$.

(b) All columns be orthogonal to each other. Mathematically: $\vec{\delta}_i \cdot \vec{\delta}_2 = \vec{\delta}_3$, $\forall j \neq k$.

(c) The columns have the right orientation. Mathematically: $\vec{\delta}_1 \times \vec{\delta}_2 = \vec{\delta}_3$.

The three constraints above may be summarized as $D^T \cdot D = I$ and $\det(D)=1$.

Given that the goal is to solve the equation based on using minimization, a term can be added to the loss function that, for any D indicates how far it is from meeting the above constraints. One way to achieve this is using the following geometric loss function:

$$\mu^G(D) = \sum_{j=1}^{3}\left(\|\vec{\delta}_j\| - 1\right)^2 + \sum_{j=1}^{3}\sum_{k \neq j}\left(\vec{\delta}_j^T \vec{\delta}_k\right)^2 + (\det(D) - 1)^2 \tag{7}$$

A more compact formulation, using the Frobenius norm $\|\cdot\|_F$ is:

$$\mu^G(D) = \left\|D^T \cdot D - I\right\|_F^2 + (\det(D) - 1)^2 \tag{8}$$

The last rule ($\vec{\delta}_1 \times \vec{\delta}_2 = \vec{\delta}_3$) may be implicitly enforced by not including $\vec{\delta}_3$ in the list of variables to optimize, and then compute it from $\vec{\delta}_1$ and $\vec{\delta}_2$.

Lastly, to build the complete loss function, the finder device 702 may be configured to combine the RTT term and the geometric term to obtain the complete loss function:

$$\mu(\vec{\gamma}, D) = \mu^R(\vec{\gamma}, D) + \alpha \cdot \mu^G(D) \tag{9}$$

where $\alpha$ may be some large non-negative weight used to ensure that the geometric constraints of the problem are closely satisfied. Once the loss function is built, the finder device 702 may minimize it to obtain the most likely values for $R_b = (\vec{\gamma}, D)$:

$$R_b^* = (\vec{\gamma}^*, D^*) = \underset{\vec{\gamma}, D}{\operatorname{argmin}}\left\{\mu^R(\vec{\gamma}, D) + \alpha \cdot \mu^G(D)\right\} \tag{10}$$

In some implementations, the finder device 702 may be configured to use an alternative loss function with six (6) dimensions. In most scenarios, the finder device 702 may not specify twelve (12) variables to track the possible values of the target device 704's reference frame $R_b$. It may be sufficient to use three (3) variables to track $\vec{\gamma}$ and three (3) rotations to obtain the basis vectors $\vec{\delta}_1, \vec{\delta}_2, \vec{\delta}_2$, for a total of six (6) variables to optimize.

For example, an orthogonal matrix D may be obtained by applying up to three successive rotations of I.

$$D = T_3 \cdot T_2 \cdot T_1 \cdot I = T_3 \cdot T_2 \cdot T_1 \tag{11}$$

where rotation matrices $T_1$, $T_2$, $T_3$ are given by:

$$T_1 = \begin{bmatrix} 1 & 0 & 0 \\ 0 & \cos(\theta_1) & -\sin(\theta_1) \\ 0 & \sin(\theta_1) & \cos(\theta_1) \end{bmatrix} \tag{12}$$

$$T_2 = \begin{bmatrix} \cos(\theta_2) & 0 & \sin(\theta_2) \\ 0 & 1 & 0 \\ -\sin(\theta_2) & 0 & \cos(\theta_2) \end{bmatrix}$$

$$T_3 = \begin{bmatrix} \cos(\theta_3) & -\sin(\theta_3) & 0 \\ \sin(\theta_3) & \cos(\theta_3) & 0 \\ 0 & 0 & 1 \end{bmatrix}$$

With this approach, the finder device 902 may not specify to track (and optimize) the nine (9) individual entries of matrix D. Instead, the finder device 902 may be configured to optimize the three angles $\theta_1, \theta_2, \theta_3$ and use them to compute D as specified, ensuring that D automatically meets the orthogonality constraints (so they can be removed from the loss function).

The resulting loss function may then be represented as:

$$\mu(\gamma, \theta) = \mu(\gamma_1, \gamma_2, \gamma_3, \theta_1, \theta_2, \theta_3) = \sum_{i=1}^{N}\frac{1}{2}\left(\frac{r_i - \left\|\vec{a}_i - \left(\vec{\gamma} + D \cdot \vec{b}_i\right)\right\|}{\sigma_{r_i}}\right)^2 \tag{13}$$

where:

$$D = T_3 \cdot T_2 \cdot T_1 = \begin{bmatrix} \cos(\theta_3) & -\sin(\theta_3) & 0 \\ \sin(\theta_3) & \cos(\theta_3) & 0 \\ 0 & 0 & 1 \end{bmatrix} \cdot \begin{bmatrix} \cos(\theta_2) & 0 & \sin(\theta_2) \\ 0 & 1 & 0 \\ -\sin(\theta_2) & 0 & \cos(\theta_2) \end{bmatrix} \cdot \begin{bmatrix} 1 & 0 & 0 \\ 0 & \cos(\theta_1) & -\sin(\theta_1) \\ 0 & \sin(\theta_1) & \cos(\theta_1) \end{bmatrix} \tag{14}$$

Then, the loss function may be minimized to obtain the most likely values for $R_b = (\vec{\gamma}, \vec{\theta})$:

$$R_b^* = (\vec{\gamma}^*, \vec{\theta}) = \underset{\vec{\gamma}, \vec{\theta}}{\operatorname{argmin}}\left\{\mu(\vec{\gamma}, \vec{\theta})\right\} \tag{15}$$

The finder device 702 may be configured to use one or more techniques for minimizing the loss function $\mu(\vec{\gamma}, D)$. In one example, the finder device 702 may be configured to use gradient descent (GD) or variant(s) of gradient descent (GD) for minimizing the loss function. Gradient descent techniques may estimate the gradient numerically, or may use explicit expressions for the gradient. An analytical expression for the gradient of $\mu(\vec{\gamma}, D)$ is provided below. In another example, other minimizing techniques, such as Newton's method, may also be used by the finder device 702 to improve the convergence speed of gradient descent by using information of the Hessian of the loss function $\mu(\vec{\gamma}, D)$.

Under certain conditions, the loss function $\mu(\vec{\gamma}, D)$ may have one or more local minima and GD-based algorithm may get stuck in a local minimum depending on what is the starting point for the algorithm. This may be addressed by using several techniques, such as such as running multiple GD algorithms from different starting points and then choosing the one that delivers the lowest value for $\mu(\vec{\gamma}, D)$.

In another aspect of the present disclosure, the finder device 702 may also be configured to use a derivation of the gradient of the six (6)-dimensional version of the loss function $\mu(\cdot)$, which may be useful when minimizing the function using techniques like gradient descent.

For example, when the following loss function is used:

$$\mu(\vec{\gamma}, \vec{\theta}) = \sum_{i=1}^{N} \frac{1}{2} \mu_i(\vec{\gamma}, \vec{\theta}) = \sum_{i=1}^{N} \frac{1}{2} \left( \frac{r_i - \|\vec{a}_i - (\vec{\gamma} + D \cdot \vec{b}_i)\|}{\sigma_i} \right)^2 \quad (16)$$

The gradient of each individual term $\mu_i(\vec{\gamma}, \vec{\theta})$ may be derived, and then added up. For simplicity of notation, in the rest of the section the index i is dropped. To compute its gradient, it may be useful to express $\mu(\cdot)$ as a composition of simple functions, so that a chain rule may be used.

Note depending on the implementations, the finder device 702 may be configured to perform the above functions/steps in different orders. For example, in some implementations, the finder device 702 may start the ranging session between the finder device 702 and the target device 704 first, and then send an indication to track the displacement of the target device 704 to the target device 704. In some implementations, the finder device 702 may send the indication to track the displacement of the target device 704 to the target device 704 first, and then start the ranging session between the finder device 702 and the target device 704 (e.g., which may be based on receiving a confirmation from the target device 704). In some implementations, the finder device 704 may transmit the indication to track the displacement of the target device 704 to the target device 704 along with the initiation of the ranging session (e.g., the request/initiation to start the ranging session and the indication are included in the same message/signaling).

Also, while FIG. 7 shows an example of a finder device (e.g., the finder device 702) tracking its own displacements, requesting a target device (e.g., the target device 704) to track the displacements of the target device, receiving the tracked displacements of the target device from the target device, and computing a relative location of the target device with respect to the finder device based on (1) its own displacements, the displacements of the target device, and ranging measurements between them, it is merely for illustration purposes. Certain step(s)/function(s) performed by the finder device may also be configured to be performed by another entity, such as the target device or a server.

For example, instead of receiving the displacements of the target device from the target device and computing the relative location of the target device with respect to the finder device based on their corresponding displacements and ranging measurements, the finder device may also be configured to transmit its displacements to the target device, and the target device may be configured to compute the relative location of the target device with respect to the finder device (or vice versa) based on their corresponding displacements and ranging measurements. Then, the target device may transmit the computed relative location to the finder device. Such configuration may be suitable/proper when the target device has a higher (processing/ranging) capability compared to the finder device.

In another example, both the finder device and the target device may be configured to transmit their displacements (and the ranging measurements) to a server (e.g., a cloud server). Then, the server may compute their relative location based on their displacements and the ranging measurements, and transmit their relative location to the finder device (and also the target device if specified). In other words, different aspects/steps discussed in connection with FIG. 7 may be performed by different entity depending on the implementations, and may be considered as within the scope of the present disclosure.

FIG. 8 is a diagram 800 illustration an example decomposition of the loss function $\mu(\cdot)$ into individual functions in accordance with various aspects of the present disclosure. First, $m(\cdot): \mathbb{R}^6 \rightarrow \mathbb{R}^{12}$ may be defined as the function that produces $(\vec{\gamma}, D)$ out of $(\vec{\gamma}, \vec{\theta})$. All the complexity is in the computation of D given rotation vector $\vec{\theta} = (\theta_1, \theta_2, \theta_3)$.

$$D = T_3 \cdot T_2 \cdot T_1 \quad (17)$$

To reduce the size of the equations, the following more compact notation may be used:

$$c_k := \cos(\theta_k)\, s_k := \sin(\theta_k) \quad (18)$$

$$D = \begin{bmatrix} 1 & 0 & 0 \\ 0 & c_1 & -s_1 \\ 0 & s_1 & c_1 \end{bmatrix} \cdot \begin{bmatrix} c_2 & 0 & s_2 \\ 0 & 1 & 0 \\ -s_2 & 0 & c_2 \end{bmatrix} \cdot \begin{bmatrix} c_3 & -s_3 & 0 \\ s_3 & c_3 & 0 \\ 0 & 0 & 1 \end{bmatrix} \quad (19)$$

$$D = \begin{bmatrix} c_2c_3 & s_1s_2c_3 - s_3c_1 & c_1s_2c_3 + s_1s_3 \\ c_2s_3 & s_1s_2s_3 + c_1c_3 & c_1s_2s_3 - s_1c_3 \\ -s_2 & c_1c_2 & c_1c_2 \end{bmatrix} \begin{bmatrix} \delta_{11} & \delta_{21} & \delta_{31} \\ \delta_{12} & \delta_{22} & \delta_{32} \\ \delta_{13} & \delta_{23} & \delta_{33} \end{bmatrix} \quad (20)$$

Then, $f(\cdot): \mathbb{R}^{12} \rightarrow \mathbb{R}^3$ may be defined as the function that produces $\vec{x}$ given $\vec{\gamma}$, D and target displacement $\vec{b}$.

$$\vec{x} = f(\vec{\gamma}, D) = \vec{\gamma} + D \cdot \vec{b} \quad (21)$$

Then $g(\cdot)$ is used to compute the vector difference between $\vec{a}$ (the position of the finder) and $\vec{x}$ the position of the target device 704 in the finder device 702's reference $$\vec{y} = g(\vec{x}) = \vec{a} - \vec{x} \quad (22)$$

Function $h(\cdot)$ computes the norm of the vector difference.

$$\rho = h(\vec{y}) = \|\vec{y}\| \quad (23)$$

Finally $k(\cdot)$ computes the loss function.

$$t = k(\rho) = \frac{1}{2}\left(\frac{\rho - r}{\sigma}\right)^2 \quad (24)$$

In summary, the following composition is provided:

$$\mu = k \circ h \circ g \circ f \circ m \tag{25}$$

$$\mu(\vec{\gamma}, \vec{\theta}) = k(h(g(f(m(\vec{\gamma}, \vec{\theta})))))$$

The above means that the chain rule to compute ∇u can be used:

$$\overset{1\times 6}{\overline{\nabla\mu}} = \overset{1\times 1}{\overline{\nabla k}} \cdot \overset{1\times 3}{\overline{\nabla h}} \cdot \overset{3\times 3}{\overline{\nabla g}} \cdot \overset{3\times 12}{\overline{\nabla f}} \cdot \overset{12\times 6}{\overline{\nabla m}} \tag{26}$$

When each of the individual gradients in the chain is computed:

$$\nabla k = \frac{dk}{d\rho} = \frac{d}{d\rho}\left\{\frac{1}{2}\left(\frac{\rho - r}{\sigma}\right)^2\right\} = \frac{1}{\sigma^2}(\rho - r) \tag{27}$$

$$\nabla h = \left[\frac{\partial h}{\partial y_1}, \frac{\partial h}{\partial y_2}, \frac{\partial h}{\partial y_3}\right] = \frac{\vec{y}^T}{\|\vec{y}\|} \tag{28}$$

$$\nabla g = \begin{bmatrix} -1 & 0 & 0 \\ 0 & -1 & 0 \\ 0 & 0 & -1 \end{bmatrix} = -I \tag{29}$$

The gradient $\nabla f$ may be more complex, because it is the gradient of a function $f: \mathbb{R}^{12} \rightarrow \mathbb{R}^3$, so the gradient may be a 3×12 matrix.

$$\nabla f = \nabla(\vec{\gamma} + D\vec{b}) = \nabla\left(\begin{bmatrix} \gamma_x \\ \gamma_y \\ \gamma_z \end{bmatrix} + \begin{bmatrix} \delta_{11} & \delta_{21} & \delta_{31} \\ \delta_{12} & \delta_{22} & \delta_{32} \\ \delta_{13} & \delta_{23} & \delta_{33} \end{bmatrix} \cdot \begin{bmatrix} b_1 \\ b_2 \\ b_3 \end{bmatrix}\right) = \tag{30}$$

$$\begin{bmatrix} \frac{\partial f_x}{\partial \gamma_x} & \frac{\partial f_x}{\partial \gamma_y} & \frac{\partial f_x}{\partial \gamma_z} & \frac{\partial f_x}{\partial \delta_{11}} & \frac{\partial f_x}{\partial \delta_{12}} & \frac{\partial f_x}{\partial \delta_{13}} & \frac{\partial f_x}{\partial \delta_{21}} & \frac{\partial f_x}{\partial \delta_{22}} & \frac{\partial f_x}{\partial \delta_{23}} & \frac{\partial f_x}{\partial \delta_{33}} & \frac{\partial f_x}{\partial \delta_{32}} & \frac{\partial f_x}{\partial \delta_{33})} \\ \frac{\partial f_y}{\partial \gamma_x} & \frac{\partial f_y}{\partial \gamma_y} & \frac{\partial f_y}{\partial \gamma_z} & \frac{\partial f_y}{\partial \delta_{11}} & \frac{\partial f_y}{\partial \delta_{12}} & \frac{\partial f_y}{\partial \delta_{13}} & \frac{\partial f_y}{\partial \delta_{21}} & \frac{\partial f_y}{\partial \delta_{22}} & \frac{\partial f_y}{\partial \delta_{23}} & \frac{\partial f_y}{\partial \delta_{33}} & \frac{\partial f_y}{\partial \delta_{32}} & \frac{\partial f_y}{\partial \delta_{33}} \\ \frac{\partial f_z}{\partial \gamma_x} & \frac{\partial f_z}{\partial \gamma_y} & \frac{\partial f_z}{\partial \gamma_z} & \frac{\partial f_z}{\partial \delta_{11}} & \frac{\partial f_z}{\partial \delta_{12}} & \frac{\partial f_z}{\partial \delta_{13}} & \frac{\partial f_z}{\partial \delta_{21}} & \frac{\partial f_z}{\partial \delta_{22}} & \frac{\partial f_z}{\partial \delta_{23}} & \frac{\partial f_z}{\partial \delta_{33}} & \frac{\partial f_z}{\partial \delta_{32}} & \frac{\partial f_z}{\partial \delta_{33}} \end{bmatrix} =$$

$$\begin{bmatrix} 1 & 0 & 0 & b_1 & 0 & 0 & b_2 & 0 & 0 & b_3 & 0 & 0 \\ 0 & 1 & 0 & 0 & b_1 & 0 & 0 & b_2 & 0 & 0 & b_3 & 0 \\ 0 & 0 & 1 & 0 & 0 & b_1 & 0 & 0 & b_2 & 0 & 0 & b_3 \end{bmatrix}$$

Finally, ∇m can be computed. Given that $m:\mathbb{R}^6 \rightarrow \mathbb{R}^{12}$, the gradient ∇m may be a 12×6 matrix.

Then, the partial derivatives of D as function of $\theta_1,\theta_2,\theta_3$ may be computed, using the definition of D in Equation 20:

$$\frac{\partial \delta_{11}}{\partial \theta_1} = 0 \quad \frac{\partial \delta_{11}}{\partial \theta_2} = -s_2 c_3 \quad \frac{\partial \delta_{11}}{\partial \theta_3} = -c_2 s_3$$

$$\frac{\partial \delta_{12}}{\partial \theta_1} = 0 \quad \frac{\partial \delta_{12}}{\partial \theta_2} = -s_2 s_3 \quad \frac{\partial \delta_{12}}{\partial \theta_3} = 0$$

$$\frac{\partial \delta_{13}}{\partial \theta_1} = 0 \quad \frac{\partial \delta_{13}}{\partial \theta_2} = -c_2 \quad \frac{\partial \delta_{13}}{\partial \theta_3} = 0$$

$$\frac{\partial \delta_{21}}{\partial \theta_1} = c_1 s_2 c_3 + s_1 s_3 \quad \frac{\partial \delta_{21}}{\partial \theta_2} = s_1 c_2 c_3 \quad \frac{\partial \delta_{21}}{\partial \theta_3} = -s_1 s_2 s_3 - c_1 c_3$$

$$\frac{\partial \delta_{22}}{\partial \theta_1} = c_1 s_2 s_3 - s_1 c_3 \quad \frac{\partial \delta_{22}}{\partial \theta_2} = s_1 c_2 s_3 \quad \frac{\partial \delta_{22}}{\partial \theta_3} = s_1 s_2 c_3 - c_1 s_3$$

$$\frac{\partial \delta_{23}}{\partial \theta_1} = c_1 c_2 \quad \frac{\partial \delta_{23}}{\partial \theta_2} = -s_1 s_2 \quad \frac{\partial \delta_{23}}{\partial \theta_3} = 0$$

$$\frac{\partial \delta_{31}}{\partial \theta_1} = -s_1 s_2 c_3 + c_1 s_3 \quad \frac{\partial \delta_{31}}{\partial \theta_2} = c_1 c_2 c_3 \quad \frac{\partial \delta_{31}}{\partial \theta_3} = -c_1 s_2 s_3 + s_1 c_3$$

$$\frac{\partial \delta_{32}}{\partial \theta_1} = -s_1 s_2 s_3 - c_1 c_3 \quad \frac{\partial \delta_{32}}{\partial \theta_2} = c_1 c_2 s_3 \quad \frac{\partial \delta_{32}}{\partial \theta_3} = c_1 s_2 c_3 + s_1 s_3$$

$$\frac{\partial \delta_{33}}{\partial \theta_1} = -s_1 c_2 \quad \frac{\partial \delta_{33}}{\partial \theta_2} = -c_1 s_2 \quad \frac{\partial \delta_{33}}{\partial \theta_3} = 0$$

Now ∇m can be built:

$$\nabla m = \begin{bmatrix}
\frac{\partial \gamma_x}{\partial \gamma_x} & \frac{\partial \gamma_x}{\partial \gamma_y} & \frac{\partial \gamma_x}{\partial \gamma_z} & \frac{\partial \gamma_x}{\partial \theta_1} & \frac{\partial \gamma_x}{\partial \theta_2} & \frac{\partial \gamma_x}{\partial \theta_3} \\
\frac{\partial \gamma_y}{\partial \gamma_x} & \frac{\partial \gamma_y}{\partial \gamma_y} & \frac{\partial \gamma_y}{\partial \gamma_z} & \frac{\partial \gamma_y}{\partial \theta_1} & \frac{\partial \gamma_y}{\partial \theta_2} & \frac{\partial \gamma_y}{\partial \theta_3} \\
\frac{\partial \gamma_z}{\partial \gamma_x} & \frac{\partial \gamma_z}{\partial \gamma_y} & \frac{\partial \gamma_z}{\partial \gamma_z} & \frac{\partial \gamma_z}{\partial \theta_1} & \frac{\partial \gamma_z}{\partial \theta_2} & \frac{\partial \gamma_z}{\partial \theta_3} \\
\frac{\partial \delta_{11}}{\partial \gamma_x} & \frac{\partial \delta_{11}}{\partial \gamma_y} & \frac{\partial \delta_{11}}{\partial \gamma_z} & \frac{\partial \delta_{11}}{\partial \theta_1} & \frac{\partial \delta_{11}}{\partial \theta_2} & \frac{\partial \delta_{11}}{\partial \theta_3} \\
\frac{\partial \delta_{12}}{\partial \gamma_x} & \frac{\partial \delta_{12}}{\partial \gamma_y} & \frac{\partial \delta_{12}}{\partial \gamma_z} & \frac{\partial \delta_{12}}{\partial \theta_1} & \frac{\partial \delta_{12}}{\partial \theta_2} & \frac{\partial \delta_{12}}{\partial \theta_3} \\
\frac{\partial \delta_{13}}{\partial \gamma_x} & \frac{\partial \delta_{13}}{\partial \gamma_y} & \frac{\partial \delta_{13}}{\partial \gamma_z} & \frac{\partial \delta_{13}}{\partial \theta_1} & \frac{\partial \delta_{13}}{\partial \theta_2} & \frac{\partial \delta_{13}}{\partial \theta_3} \\
\frac{\partial \delta_{21}}{\partial \gamma_x} & \frac{\partial \delta_{21}}{\partial \gamma_y} & \frac{\partial \delta_{21}}{\partial \gamma_z} & \frac{\partial \delta_{21}}{\partial \theta_1} & \frac{\partial \delta_{21}}{\partial \theta_2} & \frac{\partial \delta_{21}}{\partial \theta_3} \\
\frac{\partial \delta_{22}}{\partial \gamma_x} & \frac{\partial \delta_{22}}{\partial \gamma_y} & \frac{\partial \delta_{22}}{\partial \gamma_z} & \frac{\partial \delta_{22}}{\partial \theta_1} & \frac{\partial \delta_{22}}{\partial \theta_2} & \frac{\partial \delta_{22}}{\partial \theta_3} \\
\frac{\partial \delta_{23}}{\partial \gamma_x} & \frac{\partial \delta_{23}}{\partial \gamma_y} & \frac{\partial \delta_{23}}{\partial \gamma_z} & \frac{\partial \delta_{23}}{\partial \theta_1} & \frac{\partial \delta_{23}}{\partial \theta_2} & \frac{\partial \delta_{23}}{\partial \theta_3} \\
\frac{\partial \delta_{31}}{\partial \gamma_x} & \frac{\partial \delta_{31}}{\partial \gamma_y} & \frac{\partial \delta_{31}}{\partial \gamma_z} & \frac{\partial \delta_{31}}{\partial \theta_1} & \frac{\partial \delta_{31}}{\partial \theta_2} & \frac{\partial \delta_{31}}{\partial \theta_3} \\
\frac{\partial \delta_{32}}{\partial \gamma_x} & \frac{\partial \delta_{32}}{\partial \gamma_y} & \frac{\partial \delta_{32}}{\partial \gamma_z} & \frac{\partial \delta_{32}}{\partial \theta_1} & \frac{\partial \delta_{32}}{\partial \theta_2} & \frac{\partial \delta_{32}}{\partial \theta_3} \\
\frac{\partial \delta_{33}}{\partial \gamma_x} & \frac{\partial \delta_{33}}{\partial \gamma_y} & \frac{\partial \delta_{33}}{\partial \gamma_z} & \frac{\partial \delta_{33}}{\partial \theta_1} & \frac{\partial \delta_{33}}{\partial \theta_2} & \frac{\partial \delta_{33}}{\partial \theta_3}
\end{bmatrix} \tag{31}$$

-continued $$\nabla m = \begin{bmatrix}
1 & 0 & 0 & 0 & 0 & 0 \\
0 & 1 & 0 & 0 & 0 & 0 \\
0 & 0 & 1 & 0 & 0 & 0 \\
0 & 0 & 0 & 0 & -s_2 c_3 & -c_2 s_3 \\
0 & 0 & 0 & 0 & -s_2 s_3 & 0 \\
0 & 0 & 0 & 0 & -c_2 & 0 \\
0 & 0 & 0 & c_1 s_2 c_3 + s_1 s_3 & s_1 c_2 c_3 & -s_1 s_2 s_3 - c_1 c_3 \\
0 & 0 & 0 & c_1 s_2 s_3 + s_1 c_3 & s_1 c_2 s_3 & s_1 s_2 c_3 - c_1 c_3 \\
0 & 0 & 0 & c_1 c_2 & -s_1 s_2 & 0 \\
0 & 0 & 0 & -s_1 s_2 c_3 + c_1 s_3 & c_1 c_2 c_3 & -c_1 s_2 s_3 + s_1 c_3 \\
0 & 0 & 0 & -s_1 s_2 s_3 - c_1 c_3 & c_1 c_2 s_3 & c_1 s_2 c_3 + s_1 s_3 \\
0 & 0 & 0 & -s_1 c_2 & -c_1 s_2 & 0
\end{bmatrix} \tag{32}$$

All the individual elements of the chain are available for computing the complete gradient:

$$\begin{aligned}
\nabla \mu &= \nabla k \cdot \nabla h \cdot \nabla g \cdot \nabla f \cdot \nabla m \\
&= \frac{\rho - r}{\sigma^2} \cdot \frac{y^T}{\|\vec{y}\|} \cdot (-I) \cdot \nabla f \cdot \nabla m \\
&= \frac{r - \left\|\vec{a} - \left(\vec{\gamma} + D\vec{b}\right)\right\|}{\sigma^2} \cdot \frac{\left(\vec{a} - \left(\vec{\gamma} + D\vec{b}\right)\right)^T}{\left\|\vec{a} - \left(\vec{\gamma} + D\vec{b}\right)\right\|} \cdot \nabla f \cdot \nabla m
\end{aligned} \tag{33}$$

where $\nabla f$ is defined in Equation 30, ∇m is defined in Equation 32, and D is defined in Equation 20. The i indices can now be reintroduced:

$$\nabla \mu_i = \frac{r_i - \left\|\vec{a}_i - \left(\vec{\gamma} + D \cdot \vec{b}_i\right)\right\|}{\sigma_i^2} \cdot \frac{\left(\vec{a}_i - \left(\vec{\gamma} + D \cdot \vec{b}_i\right)\right)^T}{\left\|\vec{a}_i - \left(\vec{\gamma} + D \cdot \vec{b}_i\right)\right\|} \cdot \nabla f_i \cdot \nabla m \tag{34}$$

Finally, the gradient for the complete loss function may be obtained based on:

$$\nabla \mu = \sum_{i=1}^{N} \nabla \mu_i \tag{35}$$

where $\nabla \mu_i$ is defined in Equation 34.

Figure 9:
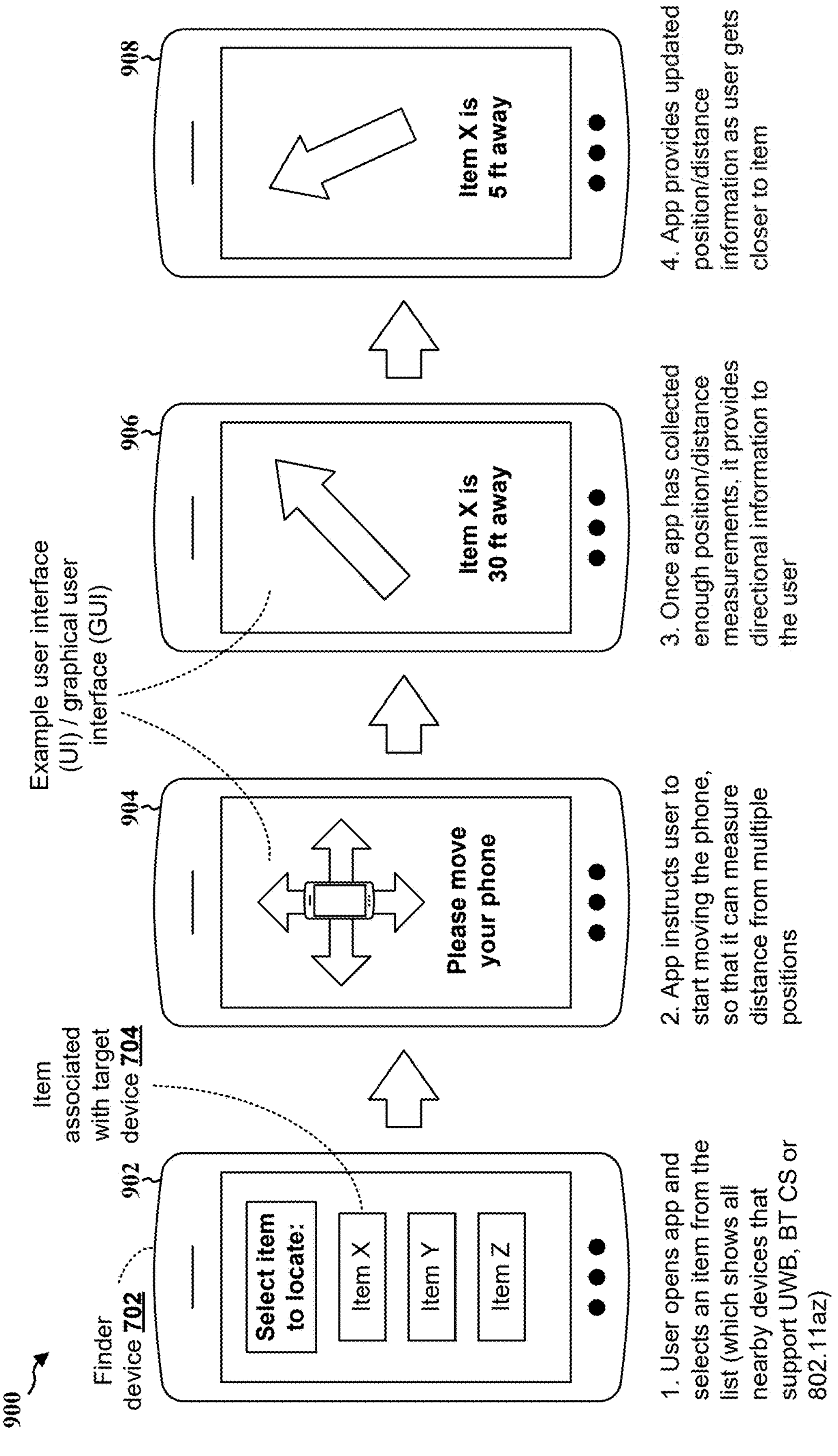
FIG. 9 is a diagram illustrating an example user experience of a finder device locating a target device in accordance with various aspects of the present disclosure.

FIG. 9 is a diagram 900 illustrating an example user experience of a finder device locating a target device in accordance with various aspects of the present disclosure. As shown at 902, the finder device 702 (e.g., a mobile phone) or an application running on the finder device 702 may instruct the user to select an item (e.g., from a list of detected items) for tracking/locating. As shown at 904, after the user selects an item (e.g., item X) that is associated with the target device 704 (e.g., a UWB tag, a pair of Bluetooth earbuds, etc.), the finder device 702 may instruct the user to move the finder device 702, such that the finder device 702 may be able to measure the distance between the finder device 702 and the target device 704 from multiple positions (e.g., as described in connection with FIG. 7). As shown at 906, after the finder device 702 has collected sufficient position/distance measurements (e.g., a minimum of three), the finder device 702 may start providing directional information of the target device 704 to the user, such as by showing the direction and the distance of the target device 704 with respect to the finder device 702. Then, as shown at 908, the finder device 702 may continue to update the directional information of the target device 704 as the user moves, and may stop the update after the user locates the target device 704 (e.g., after the finder device 702 is within a threshold distance of the target device 704).

Figure 10:
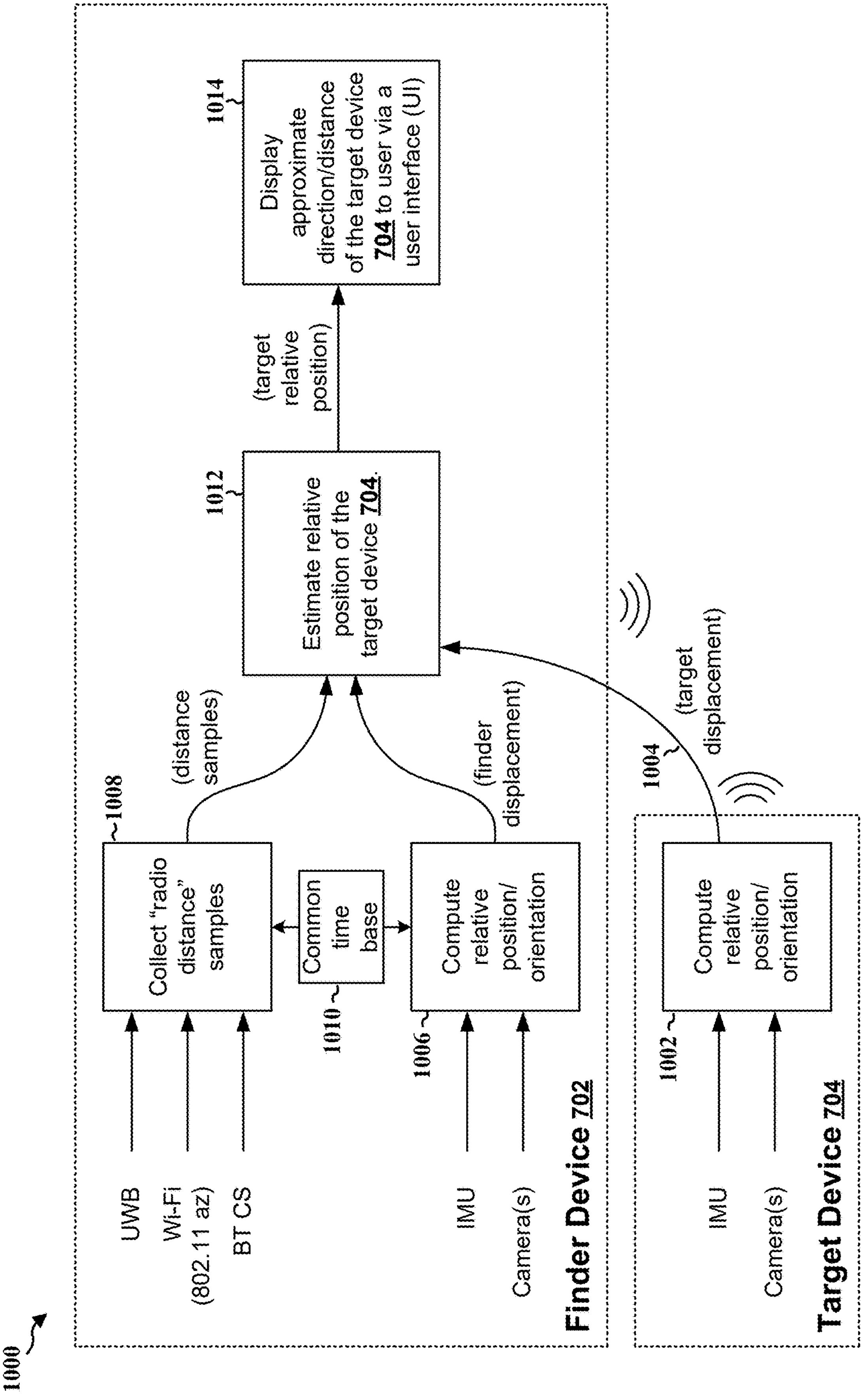
FIG. 10 is a diagram illustrating an example information flow between a finder device and a moving target device in accordance with various aspects of the present disclosure.

FIG. 10 is a diagram 1000 illustrating an example information flow between a finder device and a moving target device in accordance with various aspects of the present disclosure. As shown at 1002, the target device 704 (which may be moving) may be configured to compute/track its relative position and/or orientation (e.g., with respect to its reference frame), such as described in connection with 716 of FIG. 7. Depending on the implementation, the target device 704 may compute the relative position and/or orientation using at least one inertial measurement unit (IMU) and/or at least one camera. Then, as shown at 1004, the target device 704 may transmit the computed relative position and/or orientation (which may be referred to as the "target displacement(s)" for purposes of the present disclosure) to the finder device 702), such as described in connection with 718 of FIG. 7.

Similarly, as shown at 1006, the finder device 702 may also be configured to compute/track its relative position and/or orientation (e.g., with respect to its reference frame), such as described in connection with 714 of FIG. 7. The computed relative position and/or orientation be referred to as the "finder displacement(s)" for purposes of the present disclosure. In addition, as shown at 1008, the finder device 702 may be configured to collect radio distance samples (which may be referred to as the "distance sample(s)" for purposes of the present disclosure), such as performing a set of ranging with the target device 704 periodically as described in connection with 720 of FIG. 7. The finder device 702 may collect the radio samples or perform the set of ranging based on using UWB ranging, Wi-Fi® ranging (e.g., 802.11az), and/or BT CS, etc. In some implementations, as shown at 1010, the module for computing/tracking the relative position and/or orientation of the finder device 702 and the module for collecting the radio distance samples may be configured to have a common time base, such that a set of computed positions and/or orientations of the finder device 702 may corresponds to a set of radio distance samples based on time.

As shown at 1012, based on the target displacement, the finder displacement, and the distance samples, the finder device 702 may estimate the relative position (e.g., relative distance and relative direction) of the target device 704 (which may be referred to as the "target relative position" for purposes of the present disclosure), such as described in connection with 722 of FIG. 7. Then, as shown at 1014, based on the estimated relative position of the target device 704, the finder device 702 may display the approximate direction and/or distance of the target device 704 to its user, such as via a user interface (UI) as described in connection with FIG. 9.

Figure 11:
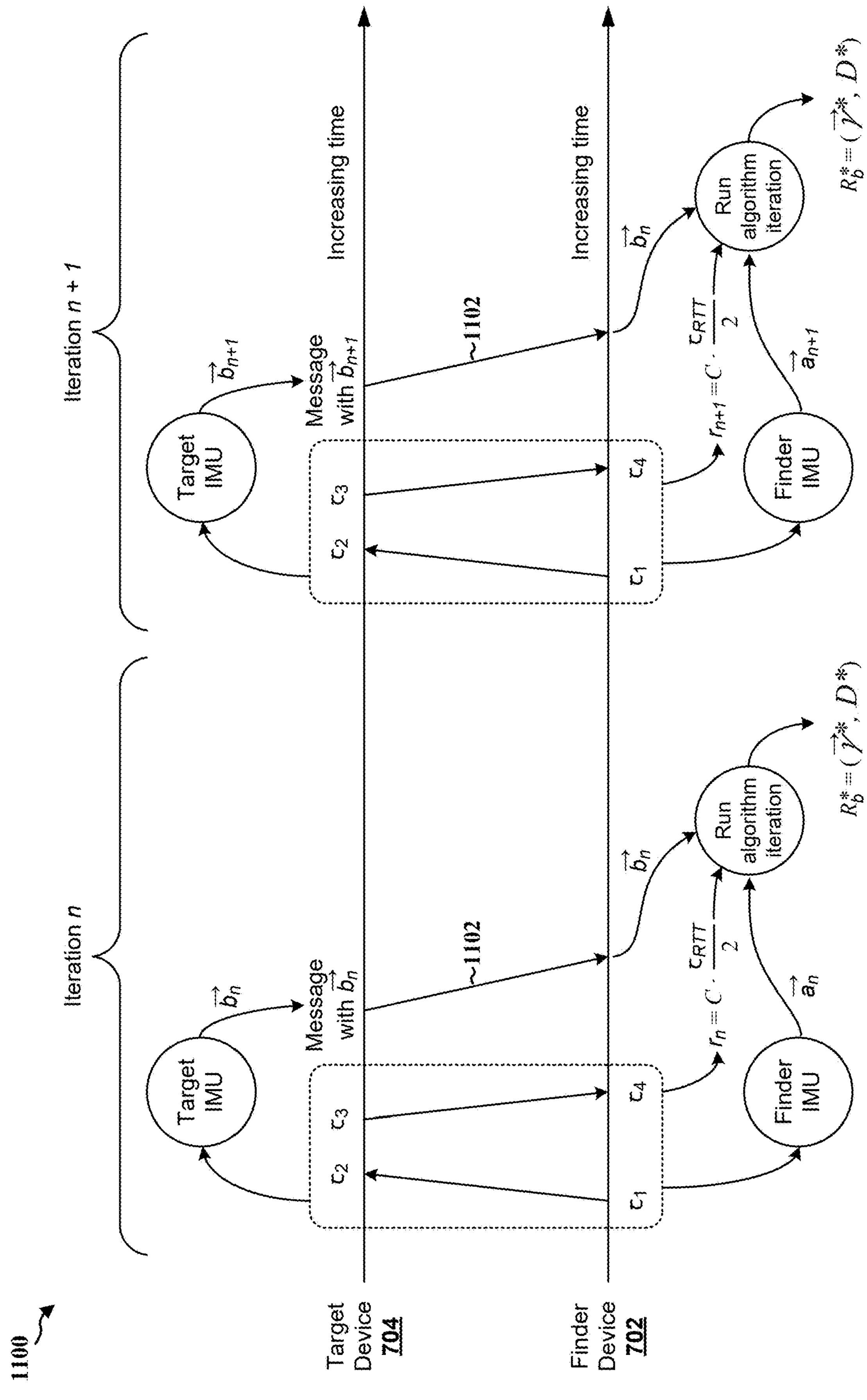
FIG. 11 is a diagram 1100 illustrating an example of multiple rounds of round-trip-time (RTT) measurement and position sharing between a finder device and a target device in accordance with various aspects of the present disclosure.

FIG. 11 is a diagram 1100 illustrating an example of multiple rounds of RTT measurement and position sharing between a finder device and a target device in accordance with various aspects of the present disclosure. In most scenarios, a tracking mechanism/algorithm may specify a finder device to be synchronized with a target device as they may not have perfectly synchronized clocks. However, aspects presented herein may not specify the finder device 702 to be synchronized with the target device 704.

First, the underlying protocols used for the finder device 702 to perform the ranging (e.g., UWB, 802.11az and/or BT channel sounding, etc.) may have internal mechanisms to handle small deviations in clocks frequency between the finder device 702 and the target device 704, in such a way that its impact on RTT (round-trip time) measurement is mitigated.

Second, there may be an implicit synchronization step each time the finder device 702 and the target device 704 perform a ranging handshake, so both devices may refer to that specific handshake when they later exchange position information. For example, as shown at 1102, each time the finder device 702 and the target device 704 perform an RTT exchange, the follow-on message from the target device 704 to the finder device 702 may include the target device 704's position information for the time when the RTT handshake was performed. This may enable the finder device 702 to keep track of which of the target device 704 position $\vec{b}_i$ correspond to which $r_i$, so that they may be fed correctly to the algorithm discussed in connection with FIGS. 7 and 10.

Aspects presented herein may enable a device (e.g., a tracking device) to accurately locate a moving target using a single antenna, provided that both devices have the capability to measure and track their own displacements. In one configuration, a target device may track its own relative position/orientation (relative to its own reference frame) and send the information to the finder device, which may also track its own position/orientation (relative to its own reference frame) along with the ranges from the target devices at different points. Then the finder device may run an algorithm (building and minimizing a loss function) to estimate the reference frame of the target, thereby estimating the actual position of the target.

As aspects presented herein do not specify the use of multiple antennas (e.g., as it does not specify measuring AoA), aspects presented herein may reduce device manufacturing cost and device size. As such, aspects presented herein may enable location capabilities to be extended to low-end devices that do not have enough antennas (e.g., to single antenna devices or devices configured to use just one antenna in multiple antennas). For example, some wireless devices may specify multiple antennas (e.g., a premium phone with four antennas) to measure the AoA of signals from a target in order to locate and track the target. However, aspects presented herein may enable a wireless device to locate a target using a single antenna and without specifying AoA information. As such, aspects presented herein may enable more wireless devices, such as low-end wireless devices, to have tracking capabilities.

Figure 12:
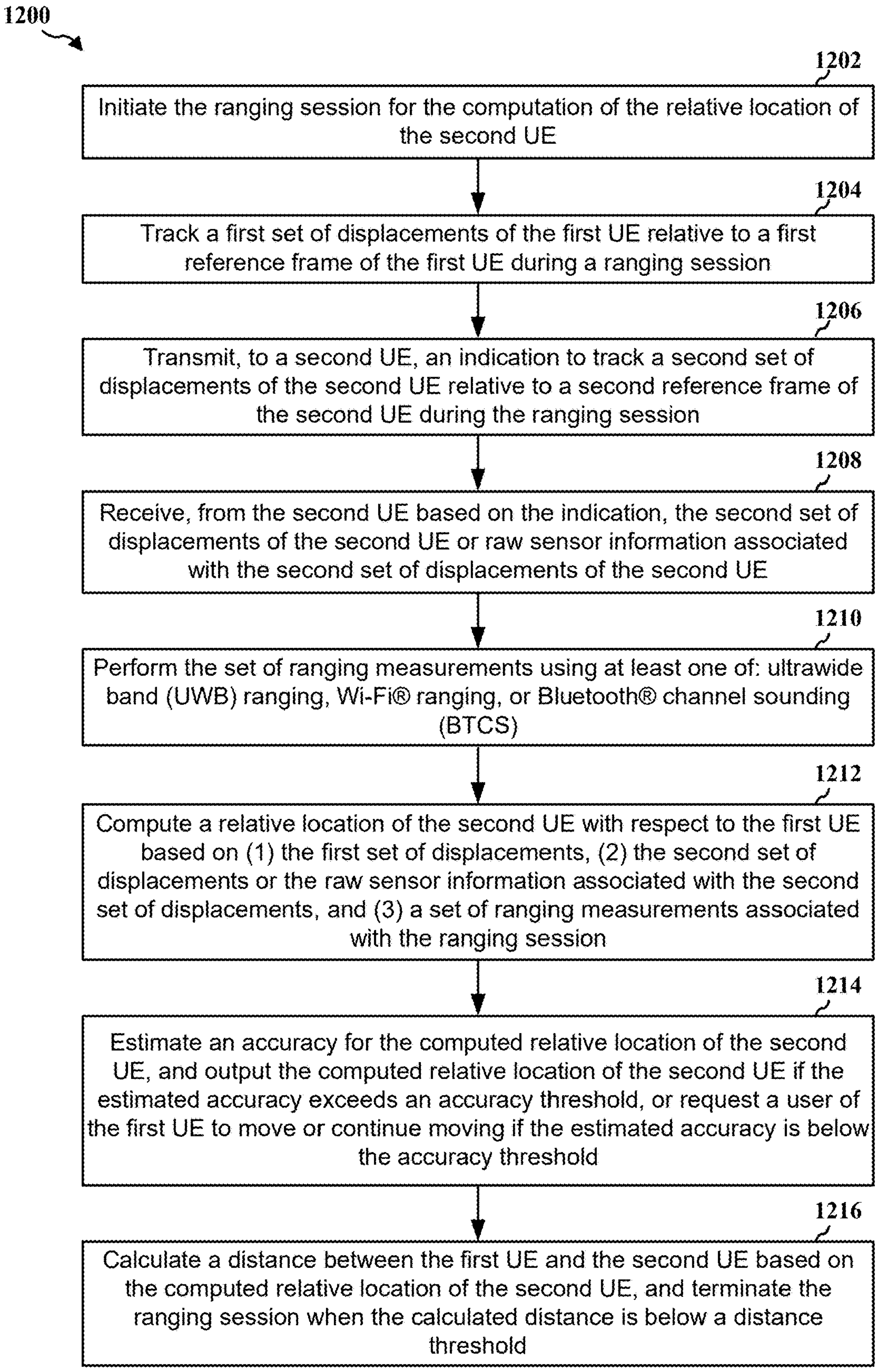
FIG. 12 is a flowchart of a method of wireless communication.

FIG. 12 is a flowchart 1200 of wireless communication at a user equipment (UE) (e.g., a first UE). The method may be performed by a UE (e.g., the UE 104, 404; the first device 502; the finder device 702; the apparatus 1404). The method may enable the UE to accurately locate a moving target using a single antenna.

At 1204, a first UE may track a first set of displacements of the first UE relative to a first reference frame of the first UE during a ranging session, such as described in connection with FIG. 7. For example, as shown at 714, the finder device 702 may be configured to track and record its own displacements periodically (e.g., every X seconds, milliseconds, etc.). The tracking of the first set of displacements of the first UE may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In one example, to track the first set of displacements of the first UE relative to the first reference frame of the first UE, the first UE may be configured to track the first set of displacements of the first UE relative to the first reference frame of the first UE while the first UE is in mobility.

In another example, to track the first set of displacements of the first UE, the first UE may be configured to track the first set of displacements of the first UE using at least one of a camera or an inertial measurement unit (IMU).

In another example, the first UE is a single-antenna UE or is configured to use one antenna in multiple antennas for the ranging session.

At 1206, the first UE may transmit, to a second UE, an indication to track a second set of displacements of the second UE relative to a second reference frame of the second UE during the ranging session, such as described in connection with FIG. 7. For example, as shown at 717, the target device 704 may track or may start to track its displacements based on a request from the finder device 702. For example, during a tracking/ranging session, the finder device 702 may transmit a request or an indication to the target device 704 to track and report the displacements of the target device 704 (relative to a reference frame that may be different from the finder device 702). The transmission of the indication may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In one example, the first UE may detect that the second UE is in mobility, where the transmission of the indication is based on the detection that the second UE is in mobility.

In another example, the first reference frame is different from the second reference frame.

In another example, information associated with the second reference frame of the second UE is below a certainty threshold or unavailable at the first UE prior to the transmission of the indication.

At 1208, the first UE may receive, from the second UE based on the indication, the second set of displacements of the second UE or raw sensor information associated with the second set of displacements of the second UE, such as described in connection with FIG. 7. For example, as shown at 718, the finder device 702 may receive the tracked displacements (e.g., the set of vectors $[\vec{b}_1, \vec{b}_2, \vec{b}_3, \ldots, \vec{b}_N]$) of the target device 704 or raw information/measurements related to the tracked displacements of the target device 704 from the target device 704, such as over wireless communications. The reception of the second set of displacements or the raw sensor information may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

At 1212, the first UE may compute a relative location of the second UE with respect to the first UE based on (1) the first set of displacements, (2) the second set of displacements or the raw sensor information associated with the second set of displacements, and (3) a set of ranging measurements associated with the ranging session, such as described in connection with FIG. 7. For example, as shown at 722, based on the displacements of the finder device 702 ($\vec{a}_i$)), the displacements of the target device 704 ($\vec{b}_i$), and the ranging measurements ($r_i$) between them, the finder device 702 may be able to estimate the location and/or the relative direction of the target device 704. The computation of the relative location may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In one example, as shown at 1202, the first UE may initiate the ranging session for the computation of the relative location of the second UE, such as described in connection with FIG. 7. For example, the finder device 702 may be configured to initiate a ranging/tracking session with the target device 704 to determine the relative location of the target device. The initiation of the ranging session may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In another example, as shown at 1210, the first UE may perform the set of ranging measurements using at least one of: ultrawide band (UWB) ranging, Wi-Fi® ranging, or Bluetooth® channel sounding (BT CS), such as described in connection with FIGS. 5 and 7. For example, as shown at 720, the finder device 702 is configured to perform a set of ranging with the target device 704 periodically, such as described in connection with FIG. 5 (e.g., using UWB ranging, Wi-Fi ranging, or BT CS, etc.). The set of ranging measurements may be performed by, e.g., the tracking component 198, the one or more sensors 1418, the UWB module 1438, the transceiver(s) 1422, the cellular baseband processor(s) 1424, and/or the application processor(s) 1406 of the apparatus 1404 in FIG. 14.

In another example, the set of ranging measurements may correspond to a set of time-related measurements (e.g., a set of round-trip-time (RTT) measurements) or a set of phase-related measurements for a set of signals transmitted between the first UE and the second UE periodically during the ranging session.

In another example, to compute the relative location of the second UE with respect to the first UE based on (1) the first set of displacements, (2) the second set of displacements or the raw sensor information associated with the second set of displacements, and (3) the set of ranging measurements associated with the ranging session, the first UE may be configured to estimate a position and an orientation of the second reference frame of the second UE based on (1) the first set of displacements, (2) the second set of displacements or the raw sensor information associated with the second set of displacements, and (3) the set of ranging measurements using a loss function, and compute the relative location of the second UE with respect to the first UE based on the estimated position and the orientation of the second reference frame.

In another example, as shown at 1214, the first UE may estimate an accuracy for the computed relative location of the second UE, and output the computed relative location of the second UE if the estimated accuracy exceeds an accuracy threshold, or request a user of the first UE to move or continue moving if the estimated accuracy is below the accuracy threshold, such as described in connection with FIG. 7. For example, in some implementations, the finder device 702 may include a method to estimate the accuracy of the position of the target device 704. If the accuracy is below an accuracy/quality threshold, the finder device 702 (or an application running on the finder device) may inform the user to keep moving. If the accuracy meets the accuracy/quality threshold, then the finder device 702 or the application may start displaying the location information to the user, such as described in connection with FIG. 9. As the finder device 702 and/or the target device 704 move, new displacement/ranging information may be obtained, and the finder device 702 may repeat the calculation to improve the accuracy. The estimation of the accuracy and/or the output of the computed relative location may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14. In some implementations, to output the computed relative location of the second UE, the first UE may be configured to display the relative location of the second UE via a screen or a display.

In another example, as shown at 1216, the first UE may calculate a distance between the first UE and the second UE based on at least one of the computed relative location of the second UE or the set of ranging measurements, and terminate the ranging session when the calculated distance is below a distance threshold, such as described in connection with FIG. 7. For example, the finder device 702 may calculate a distance between the finder device 702 and the target device 704 based on the computed relative location of the target device 704, and the finder device 702 may terminate the ranging session when the calculated distance is below a distance threshold (e.g., after the finder device 702 finds the target device), such as for purposes of reducing power consumption. The calculation of the distance and/or the termination of the ranging session may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In another example, the first UE may output an indication of the computed relative location of the second UE with respect to the first UE. In some implementations, to output the indication of the computed relative location of the second UE with respect to the first UE, the first UE may be configured to transmit the indication of the computed relative location of the second UE with respect to the first UE, display the indication via a screen, or store the indication of the computed relative location of the second UE with respect to the first UE.

In another example, the first UE may provide, a user interface (UI), at least one of (1) a first guidance for moving the first UE, or (2) a second guidance for moving the first UE towards a direction. In some implementations, the UI may include a graphical user interface (GUI) configured to display a first graphical icon that is configured to move as the first UE is moved.

Figure 13:
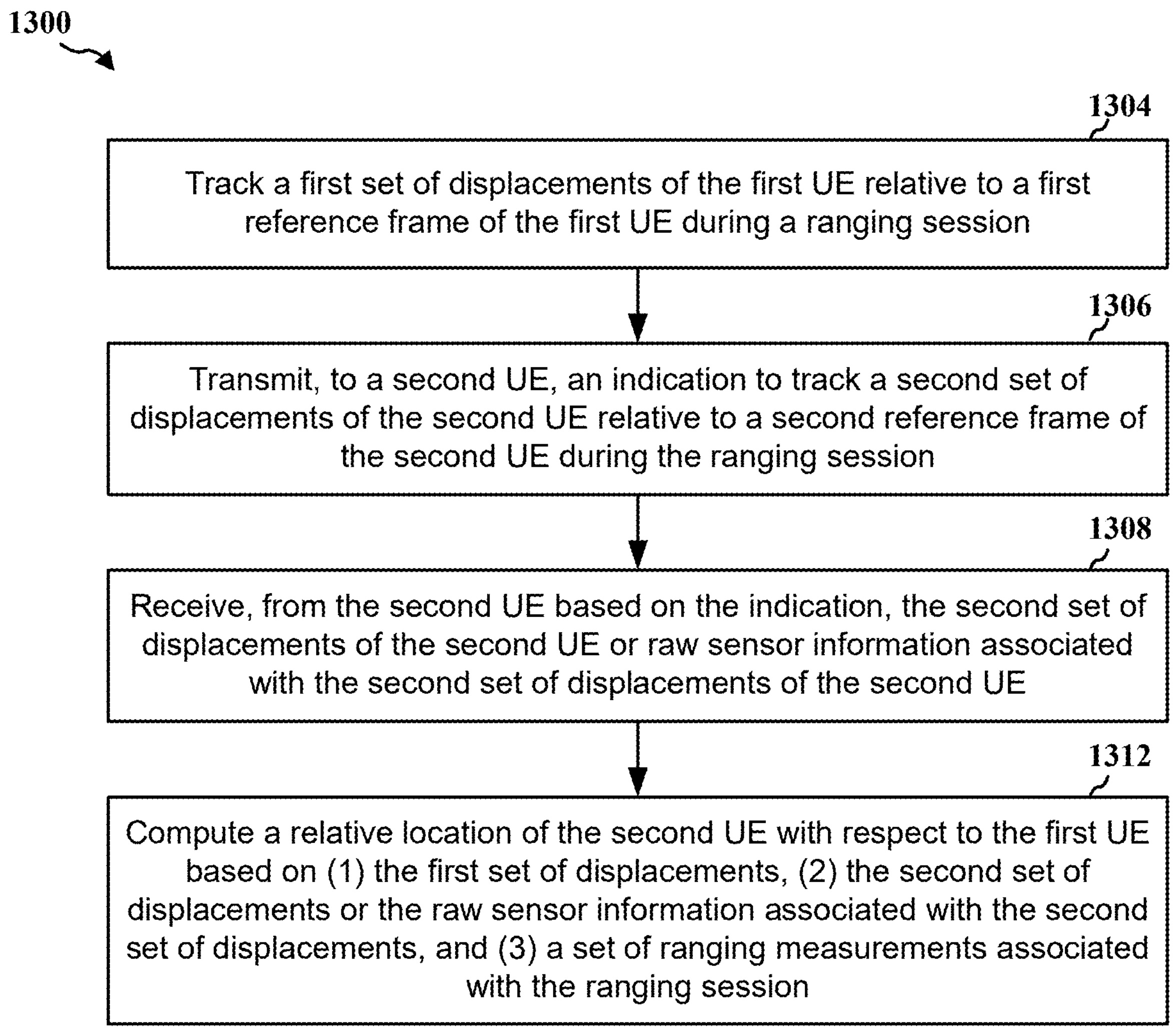
FIG. 13 is a flowchart of a method of wireless communication.

FIG. 13 is a flowchart 1300 of wireless communication at a user equipment (UE) (e.g., a first UE). The method may be performed by a UE (e.g., the UE 104, 404; the first device 502; the finder device 702; the apparatus 1404). The method may enable the UE to accurately locate a moving target using a single antenna.

At 1304, a first UE may track a first set of displacements of the first UE relative to a first reference frame of the first UE during a ranging session, such as described in connection with FIG. 7. For example, as shown at 714, the finder device 702 may be configured to track and record its own displacements periodically (e.g., every X seconds, milliseconds, etc.). The tracking of the first set of displacements of the first UE may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In one example, to track the first set of displacements of the first UE relative to the first reference frame of the first UE, the first UE may be configured to track the first set of displacements of the first UE relative to the first reference frame of the first UE while the first UE is in mobility.

In another example, to track the first set of displacements of the first UE, the first UE may be configured to track the first set of displacements of the first UE using at least one of a camera or an IMU.

In another example, the first UE is a single-antenna UE or is configured to use one antenna in multiple antennas for the ranging session.

At 1306, the first UE may transmit, to a second UE, an indication to track a second set of displacements of the second UE relative to a second reference frame of the second UE during the ranging session, such as described in connection with FIG. 7. For example, as shown at 717, the target device 704 may track or may start to track its displacements based on a request from the finder device 702. For example, during a tracking/ranging session, the finder device 702 may transmit a request or an indication to the target device 704 to track and report the displacements of the target device 704 (relative to a reference frame that may be different from the finder device 702). The transmission of the indication may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In one example, the first UE may detect that the second UE is in mobility, where the transmission of the indication is based on the detection that the second UE is in mobility.

In another example, the first reference frame is different from the second reference frame.

In another example, information associated with the second reference frame of the second UE is below a certainty threshold or unavailable at the first UE prior to the transmission of the indication.

At 1308, the first UE may receive, from the second UE based on the indication, the second set of displacements of the second UE or raw sensor information associated with the second set of displacements of the second UE, such as described in connection with FIG. 7. For example, as shown at 718, the finder device 702 may receive the tracked displacements (e.g., the set of vectors $[\vec{b}_1, \vec{b}_2, \vec{b}_3, \ldots, \vec{b}_N]$) of the target device 704 or raw information/measurements related to the tracked displacements of the target device 704 from the target device 704, such as over wireless communications. The reception of the second set of displacements or the raw sensor information may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

At 1312, the first UE may compute a relative location of the second UE with respect to the first UE based on (1) the first set of displacements, (2) the second set of displacements or the raw sensor information associated with the second set of displacements, and (3) a set of ranging measurements associated with the ranging session, such as described in connection with FIG. 7. For example, as shown at 722, based on the displacements of the finder device 702 ($\vec{a}_i$), the displacements of the target device 704 ($\vec{b}_i$), and the ranging measurements ($r_i$) between them, the finder device 702 may be able to estimate the location and/or the relative direction of the target device 704. The computation of the relative location may be performed by, e.g., the tracking component

Figure 14:
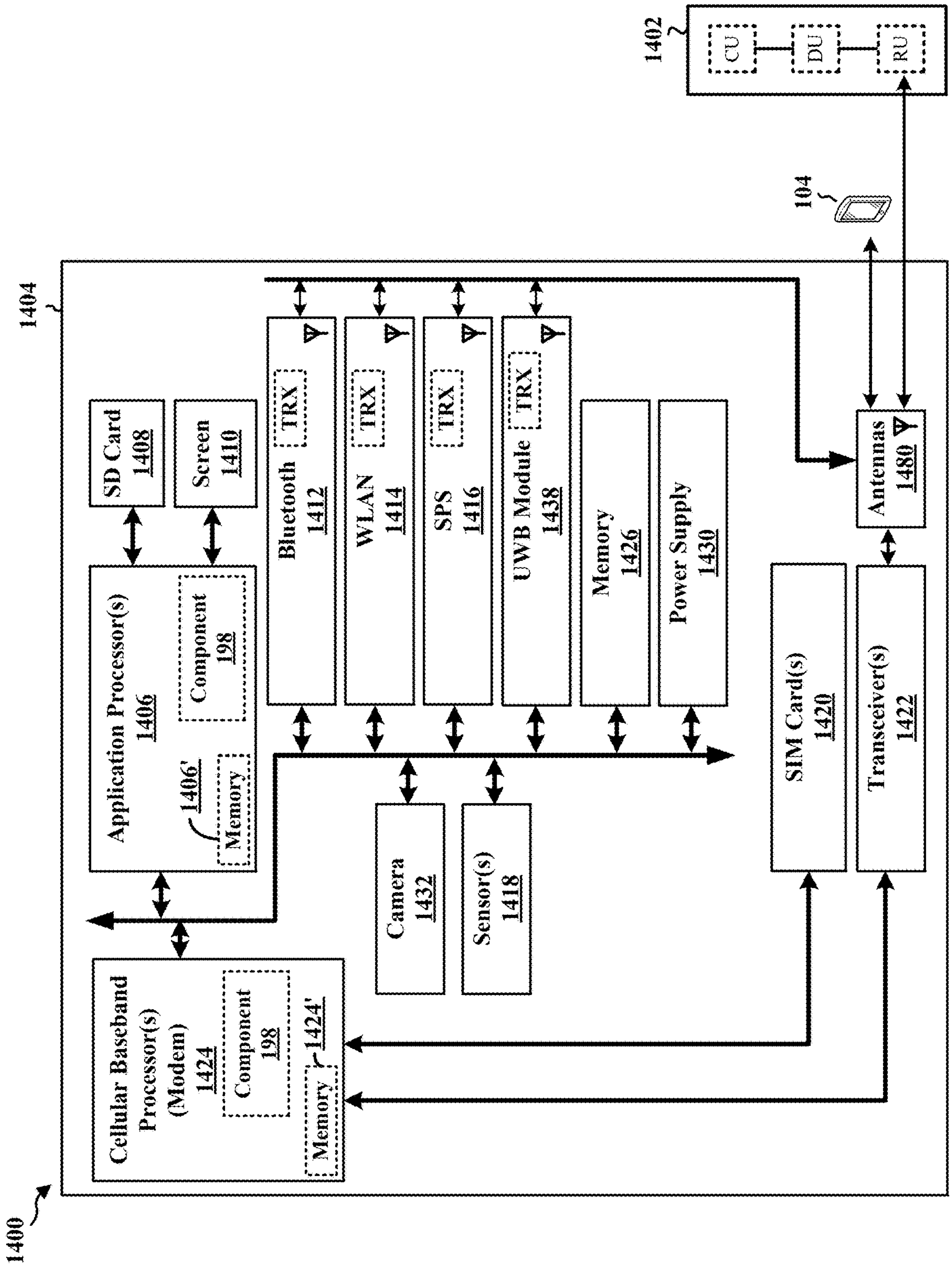
FIG. 14 is a diagram illustrating an example of a hardware implementation for an example apparatus and/or network entity.

198, the one or more sensors 1418, the camera 1432, the transceiver(s) 1422, the cellular baseband processor(s) 1424, and/or the application processor(s) 1406 of the apparatus 1404 in FIG. 14.

In one example, the first UE may initiate the ranging session for the computation of the relative location of the second UE, such as described in connection with FIG. 7. For example, the finder device 702 may be configured to initiate a ranging/tracking session with the target device 704 to determine the relative location of the target device. The initiation of the ranging session may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In another example, the first UE may perform the set of ranging measurements using at least one of: UWB ranging, Wi-Fi® ranging, or BT CS, such as described in connection with FIGS. 5 and 7. For example, as shown at 720, the finder device 702 is configured to perform a set of ranging with the target device 704 periodically, such as described in connection with FIG. 5 (e.g., using UWB ranging, Wi-Fi ranging, or BT CS, etc.). The set of ranging measurements may be performed by, e.g., the tracking component 198, the one or more sensors 1418, the UWB module 1438, the transceiver (s) 1422, the cellular baseband processor(s) 1424, and/or the application processor(s) 1406 of the apparatus 1404 in FIG. 14.

In another example, the set of ranging measurements may correspond to a set of time-related measurements or a set of phase-related measurements for a set of signals transmitted between the first UE and the second UE periodically during the ranging session.

In another example, to compute the relative location of the second UE with respect to the first UE based on (1) the first set of displacements, (2) the second set of displacements or the raw sensor information associated with the second set of displacements, and (3) the set of ranging measurements associated with the ranging session, the first UE may be configured to estimate a position and an orientation of the second reference frame of the second UE based on (1) the first set of displacements, (2) the second set of displacements or the raw sensor information associated with the second set of displacements, and (3) the set of ranging measurements using a loss function, and compute the relative location of the second UE with respect to the first UE based on the estimated position and the orientation of the second reference frame.

In another example, the first UE may estimate an accuracy for the computed relative location of the second UE, and output the computed relative location of the second UE if the estimated accuracy exceeds an accuracy threshold, or request a user of the first UE to move or continue moving if the estimated accuracy is below the accuracy threshold, such as described in connection with FIG. 7. For example, in some implementations, the finder device 702 may include a method to estimate the accuracy of the position of the target device 704. If the accuracy is below an accuracy/quality threshold, the finder device 702 (or an application running on the finder device) may inform the user to keep moving. If the accuracy meets the accuracy/quality threshold, then the finder device 702 or the application may start displaying the location information to the user, such as described in connection with FIG. 9. As the finder device 702 and/or the target device 704 move, new displacement/ranging information may be obtained, and the finder device 702 may repeat the calculation to improve the accuracy. The estimation of the accuracy and/or the output of the computed relative location may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14. In some implementations, to output the computed relative location of the second UE, the first UE may be configured to display the relative location of the second UE via a screen or a display.

In another example, the first UE may calculate a distance between the first UE and the second UE based on at least one of the computed relative location of the second UE or the set of ranging measurements, and terminate the ranging session when the calculated distance is below a distance threshold, such as described in connection with FIG. 7. For example, the finder device 702 may calculate a distance between the finder device 702 and the target device 704 based on the computed relative location of the target device 704, and the finder device 702 may terminate the ranging session when the calculated distance is below a distance threshold (e.g., after the finder device 702 finds the target device), such as for purposes of reducing power consumption. The calculation of the distance and/or the termination of the ranging session may be performed by, e.g., the tracking component 198, the one or more sensors 1418, the camera 1432, the transceiver(s) 1422, the cellular baseband processor(s) 1424, and/or the application processor(s) 1406 of the apparatus 1404 in FIG. 14.

In another example, the first UE may output an indication of the computed relative location of the second UE with respect to the first UE. In some implementations, to output the indication of the computed relative location of the second UE with respect to the first UE, the first UE may be configured to transmit the indication of the computed relative location of the second UE with respect to the first UE, display the indication via a screen, or store the indication of the computed relative location of the second UE with respect to the first UE.

In another example, the first UE may provide, a user interface (UI), at least one of (1) a first guidance for moving the first UE, or (2) a second guidance for moving the first UE towards a direction. In some implementations, the UI may include a graphical user interface (GUI) configured to display a first graphical icon that is configured to move as the first UE is moved.

FIG. 14 is a diagram 1400 illustrating an example of a hardware implementation for an apparatus 1404. The apparatus 1404 may be a UE (e.g., a first UE), a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB) module 1438 (e.g., a UWB transceiver), an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the UWB module 1438, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the tracking component 198 may be configured to track a first set of displacements of the first UE relative to a first reference frame of the first UE during a ranging session. The tracking component 198 may also be configured to transmit, to a second UE, an indication to track a second set of displacements of the second UE relative to a second reference frame of the second UE during the ranging session. The tracking component 198 may also be configured to receive, from the second UE based on the indication, the second set of displacements of the second UE or raw sensor information associated with the second set of displacements of the second UE. The tracking component 198 may also be configured to compute a relative location of the second UE with respect to the first UE based on (1) the first set of displacements, (2) the second set of displacements or the raw sensor information associated with the second set of displacements, and (3) a set of ranging measurements associated with the ranging session. The tracking component 198 may be within the cellular baseband processor(s) 1424, the application processor(s) 1406, or both the cellular baseband processor(s) 1424 and the application processor(s) 1406. The tracking component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for tracking a first set of displacements of the first UE relative to a first reference frame of the first UE during a ranging session. The apparatus 1404 may further include means for transmitting, to a second UE, an indication to track a second set of displacements of the second UE relative to a second reference frame of the second UE during the ranging session. The apparatus 1404 may further include means for receiving, from the second UE based on the indication, the second set of displacements of the second UE or raw sensor information associated with the second set of displacements of the second UE. The apparatus 1404 may further include means for computing a relative location of the second UE with respect to the first UE based on (1) the first set of displacements, (2) the second set of displacements or the raw sensor information associated with the second set of displacements, and (3) a set of ranging measurements associated with the ranging session.

In one configuration, the means for tracking the first set of displacements of the first UE relative to the first reference frame of the first UE may include configuring the apparatus 1404 to track the first set of displacements of the first UE relative to the first reference frame of the first UE while the first UE is in mobility.

In another configuration, the means for tracking the first set of displacements of the first UE may include configuring the apparatus 1404 to track the first set of displacements of the first UE using at least one of a camera or an inertial measurement unit (IMU).

In another configuration, the first UE is a single-antenna UE or is configured to use one antenna in multiple antennas for the ranging session.

In another configuration, the apparatus 1404 may further include means for detecting that the second UE is in mobility, where the transmission of the indication is based on the detection that the second UE is in mobility.

In another configuration, the first reference frame is different from the second reference frame.

In another configuration, information associated with the second reference frame of the second UE is below a certainty threshold or unavailable at the first UE prior to the transmission of the indication.

In another configuration, the apparatus 1404 may further include means for initiating the ranging session for the computation of the relative location of the second UE.

In another configuration, the apparatus 1404 may further include means for performing the set of ranging measurements using at least one of: UWB ranging, Wi-Fi® ranging, or BT CS.

In another configuration, the set of ranging measurements may correspond to a set of time-related measurements or a set of phase-related measurements for a set of signals transmitted between the first UE and the second UE periodically during the ranging session.

In another configuration, the means for computing the relative location of the second UE with respect to the first UE based on (1) the first set of displacements, (2) the second set of displacements or the raw sensor information associated with the second set of displacements, and (3) the set of ranging measurements associated with the ranging session may include configuring the apparatus 1404 to estimate a position and an orientation of the second reference frame of the second UE based on (1) the first set of displacements, (2) the second set of displacements or the raw sensor information associated with the second set of displacements, and (3) the set of ranging measurements using a loss function, and compute the relative location of the second UE with respect to the first UE based on the estimated position and the orientation of the second reference frame.

In another configuration, the apparatus 1404 may further include means for estimating an accuracy for the computed relative location of the second UE, and means for outputting the computed relative location of the second UE if the estimated accuracy exceeds an accuracy threshold, or means for requesting a user of the first UE to move or continue moving if the estimated accuracy is below the accuracy threshold. In some implementations, the means for outputting the computed relative location of the second UE may include configuring the apparatus 1404 to display the relative location of the second UE via a screen or a display.

In another configuration, the apparatus 1404 may further include means for calculating a distance between the first UE and the second UE based on at least one of the computed relative location of the second UE or the set of ranging measurements, and means for terminating the ranging session when the calculated distance is below a distance threshold.

In another configuration, the apparatus 1404 may further include means for outputting an indication of the computed relative location of the second UE with respect to the first UE. In some implementations, the means for outputting the indication of the computed relative location of the second UE with respect to the first UE may include configuring the apparatus 1404 to transmit the indication of the computed relative location of the second UE with respect to the first UE, display the indication via a screen, or store the indication of the computed relative location of the second UE with respect to the first UE.

The means may be the tracking component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first user equipment (UE), comprising: tracking a first set of displacements of the first UE relative to a first reference frame of the first UE during a ranging session; transmitting, to a second UE, an indication to track a second set of displacements of the second UE relative to a second reference frame of the second UE during the ranging session; receiving, from the second UE based on the indication, the second set of displacements of the second UE or raw sensor information associated with the second set of displacements of the second UE; and computing a relative location of the second UE with respect to the first UE based on (1) the first set of displacements, (2) the second set of displacements or the raw sensor information associated with the second set of displacements, and (3) a set of ranging measurements associated with the ranging session.

Aspect 2 is the method of aspect 1, further comprising: initiating the ranging session for the computation of the relative location of the second UE.

Aspect 3 is the method of aspect 1 or aspect 2, further comprising: performing the set of ranging measurements using at least one of: ultrawide band (UWB) ranging, Wi-Fi® ranging, or Bluetooth® channel sounding (BT CS).

Aspect 4 is the method of any of aspects 1 to 3, wherein the set of ranging measurements corresponds to a set of time-related measurements or a set of phase-related measurements for a set of signals transmitted between the first UE and the second UE periodically during the ranging session.

Aspect 5 is the method of any of aspects 1 to 4, wherein computing the relative location of the second UE with respect to the first UE based on (1) the first set of displacements, (2) the second set of displacements or the raw sensor information associated with the second set of displacements, and (3) the set of ranging measurements associated with the ranging session comprises: estimating a position and an orientation of the second reference frame of the second UE based on (1) the first set of displacements, (2) the second set of displacements or the raw sensor information associated with the second set of displacements, and (3) the set of ranging measurements using a loss function; and computing the relative location of the second UE with respect to the first UE based on the estimated position and the orientation of the second reference frame.

Aspect 6 is the method of any of aspects 1 to 5, further comprising: estimating an accuracy for the computed relative location of the second UE; and outputting the computed relative location of the second UE if the estimated accuracy exceeds an accuracy threshold, or requesting a user of the first UE to move or continue moving if the estimated accuracy is below the accuracy threshold.

Aspect 7 is the method of any of aspects 1 to 6, wherein outputting the computed relative location of the second UE comprises: displaying the relative location of the second UE via a screen or a display.

Aspect 8 is the method of any of aspects 1 to 7, further comprising: calculating a distance between the first UE and the second UE based on at least one of the computed relative location of the second UE or the set of ranging measurements; and terminating the ranging session when the calculated distance is below a distance threshold.

Aspect 9 is the method of any of aspects 1 to 8, wherein tracking the first set of displacements of the first UE relative to the first reference frame of the first UE comprises: tracking the first set of displacements of the first UE relative to the first reference frame of the first UE while the first UE is in mobility.

Aspect 10 is the method of any of aspects 1 to 9, further comprising: detecting that the second UE is in mobility, wherein the transmission of the indication is based on the detection that the second UE is in mobility.

Aspect 11 is the method of any of aspects 1 to 10, wherein tracking the first set of displacements of the first UE comprises: tracking the first set of displacements of the first UE using at least one of a camera or an inertial measurement unit (IMU).

Aspect 12 is the method of any of aspects 1 to 11, wherein the first reference frame is different from the second reference frame.

Aspect 13 is the method of any of aspects 1 to 12, wherein the first UE is a single-antenna UE or is configured to use one antenna in multiple antennas for the ranging session.

Aspect 14 is the method of any of aspects 1 to 13, wherein information associated with the second reference frame of the second UE is below a certainty threshold or unavailable at the first UE prior to the transmission of the indication.

Aspect 15 is the method of any of aspects 1 to 14, further comprising: outputting an indication of the computed relative location of the second UE with respect to the first UE.

Aspect 16 is the method of any of aspects 1 to 15, wherein outputting the indication of the computed relative location of the second UE with respect to the first UE comprises: transmitting the indication of the computed relative location of the second UE with respect to the first UE; displaying the indication via a screen, or storing the indication of the computed relative location of the second UE with respect to the first UE.

Aspect 17 is the method of any of aspects 1 to 16, further comprising: providing, at a user interface (UI), at least one of (1) a first guidance for moving the first UE, or (2) a second guidance for moving the first UE towards a direction.

Aspect 18 is the method of any of aspects 1 to 17, wherein the UI comprises a graphical user interface (GUI) configured to display a first graphical icon that is configured to move as the first UE is moved.

Aspect 19 is an apparatus for wireless communication at a first user equipment (UE), including: at least one memory; and at least one processor coupled to the at least one memory and, based at least in part on stored information that is stored in the at least one memory, the at least one processor, individually or in any combination, is configured to implement any of aspects 1 to 18.

Aspect 20 is the apparatus of aspect 19, further including at least one transceiver coupled to the at least one processor.

Aspect 21 is an apparatus for wireless communication at a first user equipment (UE) including means for implementing any of aspects 1 to 18.

Aspect 22 is a computer-readable medium (e.g., a non-transitory computer-readable medium) storing computer executable code, where the code when executed by a processor causes the processor to implement any of aspects 1 to 18.

Aspect 23 is a method of wireless communication at a first user equipment (UE), comprising: tracking a first set of displacements of the first UE relative to a first reference frame of the first UE during a ranging session; transmitting, to a second UE or a server, the first set of displacements of the first UE or raw sensor information associated with the first set of displacements of the first UE; and receiving, from the second UE or the server, a relative location of the second UE with respect to the first UE based on the first set of displacements.

Aspect 24 is a method of wireless communication at a second user equipment (UE), comprising: tracking a second set of displacements of the second UE relative to a second reference frame of the second UE during a ranging session; receiving, from a first UE, a first set of displacements of the first UE or raw sensor information associated with the first set of displacements of the first UE; computing a relative location of the second UE with respect to the first UE based on (1) the first set of displacements or the raw sensor information associated with the first set of displacements, (2) the second set of displacements, and (3) a set of ranging measurements associated with the ranging session; and transmitting, to the first UE, the relative location of the second UE with respect to the first UE.

Aspect 25 is a method of wireless communication at a network entity, comprising: receiving, from a first user equipment (UE), a first set of displacements of the first UE or first raw sensor information associated with the first set of displacements; receiving, from a second UE, a second set of displacements of the second UE or second raw sensor information associated with the second set of displacements; computing a relative location of the second UE with respect to the first UE based on (1) the first set of displacements or the first raw sensor information associated with the first set of displacements, (2) the second set of displacements or the second raw sensor information associated with the second set of displacements, and (3) a set of ranging measurements between the first UE and the second UE; and transmitting, to at least one of the first UE or the second UE, the relative location of the second UE with respect to the first UE.

Aspect 26 is an apparatus for wireless communication at a first user equipment (UE), comprising: a user interface (UI); at least one memory; and at least one processor coupled to the at least one memory, the at least one processor, individually or in any combination, is configured to: provide, at the UI, a guidance for moving the first UE during a ranging session; track a first set of displacements of the first UE relative to a first reference frame of the first UE when the UE is moving; transmit, to a second UE, an indication to track a second set of displacements of the second UE relative to a second reference frame of the second UE during the ranging session; receive, from the second UE based on the indication, the second set of displacements of the second UE or raw sensor information associated with the second set of displacements of the second UE; and compute a relative location of the second UE with respect to the first UE based on (1) the first set of displacements, (2) the second set of displacements or the raw sensor information associated with the second set of displacements, and (3) a set of ranging measurements associated with the ranging session.

What is claimed is:

1. An apparatus for wireless communication at a first user equipment (UE), comprising:
- at least one memory; and
- at least one processor coupled to the at least one memory, the at least one processor, individually or in any combination, is configured to:
  - track a first set of displacements of the first UE relative to a first reference frame of the first UE during a ranging session;
  - transmit, to a second UE, an indication to track a second set of displacements of the second UE relative to a second reference frame of the second UE during the ranging session;
  - receive, from the second UE based on the indication, the second set of displacements of the second UE or raw sensor information associated with the second set of displacements of the second UE;
  - compute a relative location of the second UE with respect to the first UE based on (1) the first set of displacements, (2) the second set of displacements or the raw sensor information associated with the second set of displacements, and (3) a set of ranging measurements associated with the ranging session;
  - estimate an accuracy for the computed relative location of the second UE; and
  - output the computed relative location of the second UE if the estimated accuracy exceeds an accuracy threshold, or request a user of the first UE to move or continue moving if the estimated accuracy is below the accuracy threshold.

2. The apparatus of claim 1, wherein the at least one processor, individually or in any combination, is further configured to:
- initiate the ranging session for the computation of the relative location of the second UE.

3. The apparatus of claim 1, wherein the at least one processor, individually or in any combination, is further configured to:
- perform the set of ranging measurements using at least one of:
  - ultrawide band (UWB) ranging,
  - Wi-Fi® ranging, or
  - Bluetooth® channel sounding (BT CS).

4. The apparatus of claim 1, wherein the set of ranging measurements corresponds to a set of time-related measurements or a set of phase-related measurements for a set of signals transmitted between the first UE and the second UE periodically during the ranging session.

5. The apparatus of claim 1, wherein to compute the relative location of the second UE with respect to the first UE based on (1) the first set of displacements, (2) the second set of displacements or the raw sensor information associated with the second set of displacements, and (3) the set of ranging measurements associated with the ranging session, the at least one processor, individually or in any combination, is configured to:
- estimate a position and an orientation of the second reference frame of the second UE based on (1) the first set of displacements, (2) the second set of displacements or the raw sensor information associated with the second set of displacements, and (3) the set of ranging measurements using a loss function; and
- compute the relative location of the second UE with respect to the first UE based on the estimated position and the orientation of the second reference frame.

6. The apparatus of claim 1, wherein to output the computed relative location of the second UE, the at least one processor, individually or in any combination, is configured to:

display the relative location of the second UE via a screen or a display.

7. The apparatus of claim 1, wherein the at least one processor, individually or in any combination, is further configured to:

calculate a distance between the first UE and the second UE based on at least one of the computed relative location of the second UE or the set of ranging measurements; and terminate the ranging session when the calculated distance is below a distance threshold.

8. The apparatus of claim 1, wherein to track the first set of displacements of the first UE relative to the first reference frame of the first UE, the at least one processor, individually or in any combination, is configured to:

track the first set of displacements of the first UE relative to the first reference frame of the first UE while the first UE is in mobility.

9. The apparatus of claim 1, wherein the at least one processor, individually or in any combination, is further configured to:

detect that the second UE is in mobility, wherein the transmission of the indication is based on the detection that the second UE is in mobility.

10. The apparatus of claim 1, wherein to track the first set of displacements of the first UE, the at least one processor, individually or in any combination, is configured to:

track the first set of displacements of the first UE using at least one of a camera or an inertial measurement unit (IMU).

11. The apparatus of claim 1, wherein the first reference frame is different from the second reference frame.

12. The apparatus of claim 1, wherein the first UE is a single-antenna UE or is configured to use one antenna in multiple antennas for the ranging session.

13. The apparatus of claim 1, wherein information associated with the second reference frame of the second UE is below a certainty threshold or unavailable at the first UE prior to the transmission of the indication.

14. The apparatus of claim 1, wherein the at least one processor, individually or in any combination, is further configured to:

output an indication of the computed relative location of the second UE with respect to the first UE.

15. The apparatus of claim 14, wherein to output the indication of the computed relative location of the second UE with respect to the first UE, the at least one processor, individually or in any combination, is configured to:

transmit the indication of the computed relative location of the second UE with respect to the first UE;

display the indication via a screen, or store the indication of the computed relative location of the second UE with respect to the first UE.

16. The apparatus of claim 1, further comprising a user interface (UI), wherein the at least one processor, individually or in any combination, is further configured to:

provide, at the UI, at least one of (1) a first guidance for moving the first UE, or (2) a second guidance for moving the first UE towards a direction.

17. The apparatus of claim 16, wherein the UI comprises a graphical user interface (GUI) configured to display a first graphical icon that is configured to move as the first UE is moved.

18. A method of wireless communication at a first user equipment (UE), comprising:

tracking a first set of displacements of the first UE relative to a first reference frame of the first UE during a ranging session;

transmitting, to a second UE, an indication to track a second set of displacements of the second UE relative to a second reference frame of the second UE during the ranging session;

receiving, from the second UE based on the indication, the second set of displacements of the second UE or raw sensor information associated with the second set of displacements of the second UE;

computing a relative location of the second UE with respect to the first UE based on (1) the first set of displacements, (2) the second set of displacements or the raw sensor information associated with the second set of displacements, and (3) a set of ranging measurements associated with the ranging session;

estimate an accuracy for the computed relative location of the second UE; and output the computed relative location of the second UE if the estimated accuracy exceeds an accuracy threshold, or request a user of the first UE to move or continue moving if the estimated accuracy is below the accuracy threshold.

19. An apparatus for wireless communication at a first user equipment (UE), comprising:

a user interface (UI);

at least one memory; and at least one processor coupled to the at least one memory, the at least one processor, individually or in any combination, is configured to:

provide, at the UI, a guidance for moving the first UE during a ranging session;

track a first set of displacements of the first UE relative to a first reference frame of the first UE when the UE is moving;

transmit, to a second UE, an indication to track a second set of displacements of the second UE relative to a second reference frame of the second UE during the ranging session;

receive, from the second UE based on the indication, the second set of displacements of the second UE or raw sensor information associated with the second set of displacements of the second UE;

compute a relative location of the second UE with respect to the first UE based on (1) the first set of displacements, (2) the second set of displacements or the raw sensor information associated with the second set of displacements, and (3) a set of ranging measurements associated with the ranging session;

estimate an accuracy for the computed relative location of the second UE; and output the computed relative location of the second UE if the estimated accuracy exceeds an accuracy threshold, or request a user of the first UE to move or continue moving if the estimated accuracy is below the accuracy threshold.

* * * * *